United States Patent
Parida et al.

(10) Patent No.: US 12,474,782 B2
(45) Date of Patent: Nov. 18, 2025

(54) BURST-BASED NON-GESTURE REJECTION IN A MICRO-GESTURE RECOGNITION SYSTEM

(71) Applicant: Samsung Electronics Co., Ltd., Suwon-si (KR)

(72) Inventors: Priyabrata Parida, Dallas, TX (US); Vutha Va, Plano, TX (US); Saifeng Ni, Santa Clara, CA (US); Anum Ali, Frisco, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 18/508,988

(22) Filed: Nov. 14, 2023

(65) Prior Publication Data
US 2024/0370094 A1     Nov. 7, 2024

Related U.S. Application Data
(60) Provisional application No. 63/463,203, filed on May 1, 2023.

(51) Int. Cl.
| | | |
|---|---|---|
| G06F 3/01 | (2006.01) | |
| G01S 7/41 | (2006.01) | |
| G01S 13/58 | (2006.01) | |
| G01S 13/88 | (2006.01) | |

(52) U.S. Cl.
CPC .............. *G06F 3/017* (2013.01); *G01S 7/415* (2013.01); *G01S 13/581* (2013.01); *G01S 13/88* (2013.01)

(58) Field of Classification Search
None
See application file for complete search history.

(56) References Cited

U.S. PATENT DOCUMENTS

| | | | |
|---|---|---|---|
| 10,775,483 B1 * | 9/2020 | Kim | G01S 13/584 |
| 11,442,550 B2 | 9/2022 | Qiu et al. | |
| 11,567,580 B2 | 1/2023 | Nguyen et al. | |
| 2020/0379893 A1 * | 12/2020 | Arechiga Gonzalez | G06F 30/15 |
| 2022/0003840 A1 * | 1/2022 | Tzadok | G01S 7/352 |
| 2022/0152505 A1 * | 5/2022 | Pan | A63F 13/426 |
| 2022/0214743 A1 * | 7/2022 | Dascola | G06F 3/017 |
| 2023/0013169 A1 | 1/2023 | Li et al. | |
| 2023/0039849 A1 | 2/2023 | Rao et al. | |
| 2023/0108140 A1 | 4/2023 | Stadelmayer et al. | |
| 2023/0419733 A1 * | 12/2023 | Verdie | G06V 30/1456 |

* cited by examiner

*Primary Examiner* — Toan H Vu

(57) ABSTRACT

An electronic device includes a transceiver configured to transmit and receive radar signals and a processor operatively coupled to the transceiver. The processor is configured to identify, based on the received radar signals, a plurality of radar frames related to an activity of a target. The processor is further configured to extract a plurality of features from the plurality of radar frames, compute burst attributes for the extracted features, predict a gesture based on the burst attributes, determine whether the predicted gesture is a valid gesture, and if the predicted gesture is a valid gesture, perform an action corresponding to the predicted gesture.

20 Claims, 23 Drawing Sheets

BURST-BASED NON-GESTURE REJECTION IN A MICRO-GESTURE RECOGNITION SYSTEM

CROSS-REFERENCE TO RELATED APPLICATION(S) AND CLAIM OF PRIORITY

This application claims priority under 35 U.S.C. § 119(e) to U.S. Provisional Patent Application No. 63/463,203 filed on filing May 1, 2023. The above-identified provisional patent application is hereby incorporated by reference in its entirety.

TECHNICAL FIELD

This disclosure relates generally to electronic devices. More specifically, this disclosure relates to burst-based non-gesture rejection in a micro-gesture recognition system.

BACKGROUND

Voice and gestural interactions are becoming increasingly popular in the context of ambient computing. These input methods allow the user to interact with digital devices, e.g., smart TVs, smartphones, tablets, smart home devices, AR/VR glasses etc., while performing other tasks, e.g., cooking and dining. Gestural interactions can be more effective than voice, particularly for simple interactions such as snoozing an alarm or controlling a multimedia player. For such simple interactions, gestural interactions have two main advantages over voice-based interactions, namely, complication and social-acceptability. First, the voice-based commands can often be long, and the user has to initiate with a hot word. Second, in quiet places and during conversations, the voice-based interaction can be socially awkward.

Gestural interaction with a digital device can be based on different sensor types, e.g., ultrasonic, IMU, optic, and radar. Optical sensors give the most favorable gesture recognition performance. The limitations of optic sensor based solutions, however, are sensitivity to ambient lighting conditions, privacy concerns, and battery consumption. Hence, optic sensor based solution have the inability to run for long periods of time. LIDAR based solutions can overcome some of these challenges such as lighting conditions and privacy, but the cost is still prohibitive (currently, only available in high-end devices).

SUMMARY

The present disclosure provides methods and apparatuses for burst-based non-gesture rejection in a micro-gesture recognition system.

In one embodiment, an electronic device is provided. The electronic device includes a transceiver configured to transmit and receive radar signals and a processor operatively coupled to the transceiver. The processor is configured to identify, based on the received radar signals, a plurality of radar frames related to an activity of a target. The processor is further configured to extract a plurality of features from the plurality of radar frames, compute burst attributes for the extracted features, predict a gesture based on the burst attributes, determine whether the predicted gesture is a valid gesture, and if the predicted gesture is a valid gesture, perform an action corresponding to the predicted gesture.

In another embodiment, a method of operating an electronic device is provided. The method includes identifying, based on received radar signals, a plurality of radar frames related to an activity of a target, extracting a plurality of features from the plurality of radar frames, computing burst attributes for the extracted features, determining whether the predicted gesture is a valid gesture, and if the predicted gesture is a valid gesture, performing an action corresponding to the predicted gesture.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 25, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged micro-gesture recognition system.

The superior spatial and Doppler resolution of Millimeter wave (mmWave) radars has opened up new horizons for human-computer interaction (HCI), where smart devices, such as smartphones, can be controlled through micro-gestures. The gesture-based control of the device is enabled by the gesture recognition module (GRM), which includes multiple functional blocks that leverage many machine learning-based models for the accurate identification and classification of a valid gesture activity performed by the user. One of the scenarios in the micro-gesture recognition system is the hand approaching the mmWave radar device, performing the gesture, and moving away from the device. Although very specific, this dynamic gesture input scenario may be frequently encountered. This disclosure provides an efficient solution to handle this specific scenario.

Figure 1:
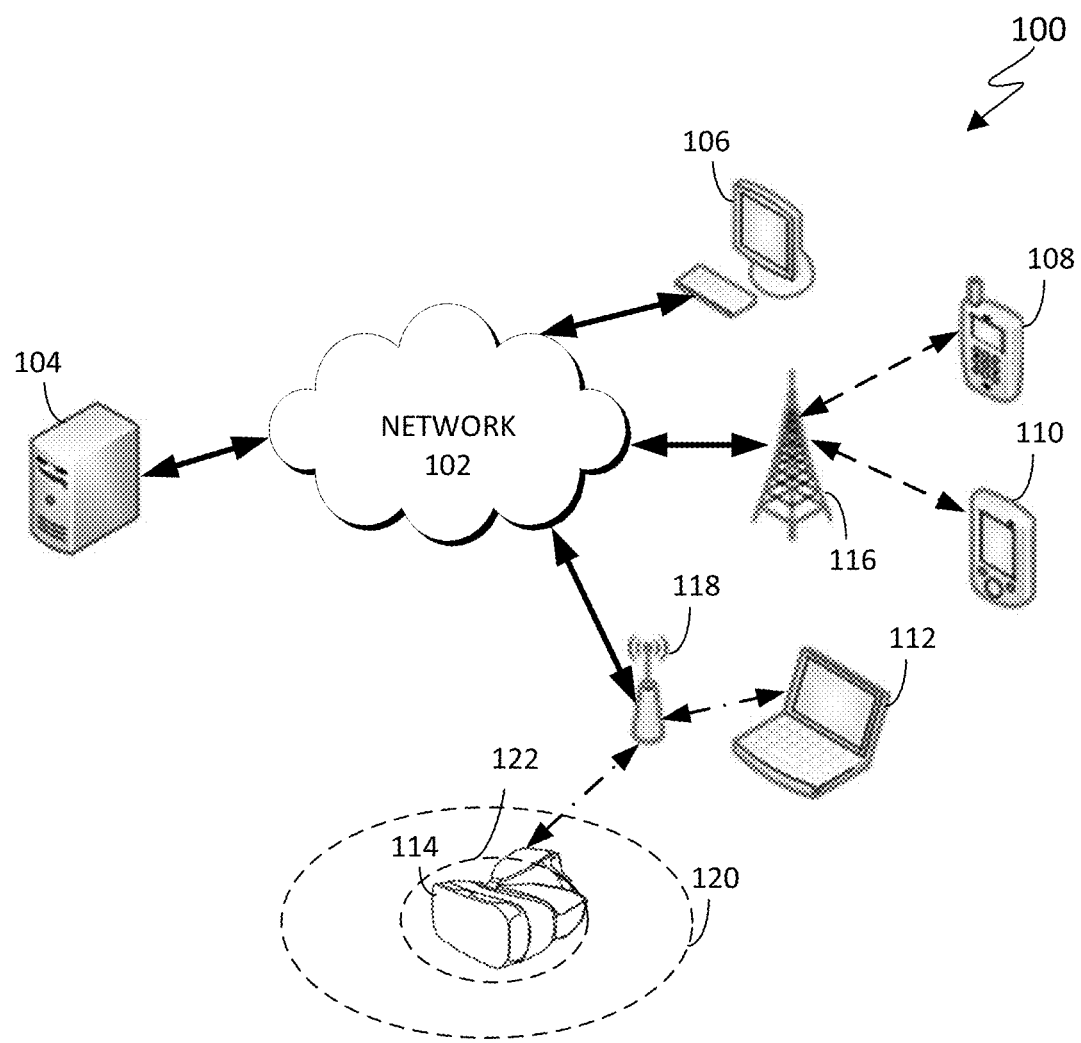
FIG. 1 illustrates an example communication system according to embodiments of the present disclosure.

FIG. 1 illustrates an example communication system according to embodiments of the present disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, AR/VR glasses, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and AR/VR glasses 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the second area 122. In certain embodiments, the boundary of the second area 122 is at a predefined proximity (e.g., 5 centimeters away) that is closer to the client device than the boundary of the first area 120, and the first area 120 can be a within a different predefined range (e.g., 30 meters away) from the client device where the user is likely to perform a gesture.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
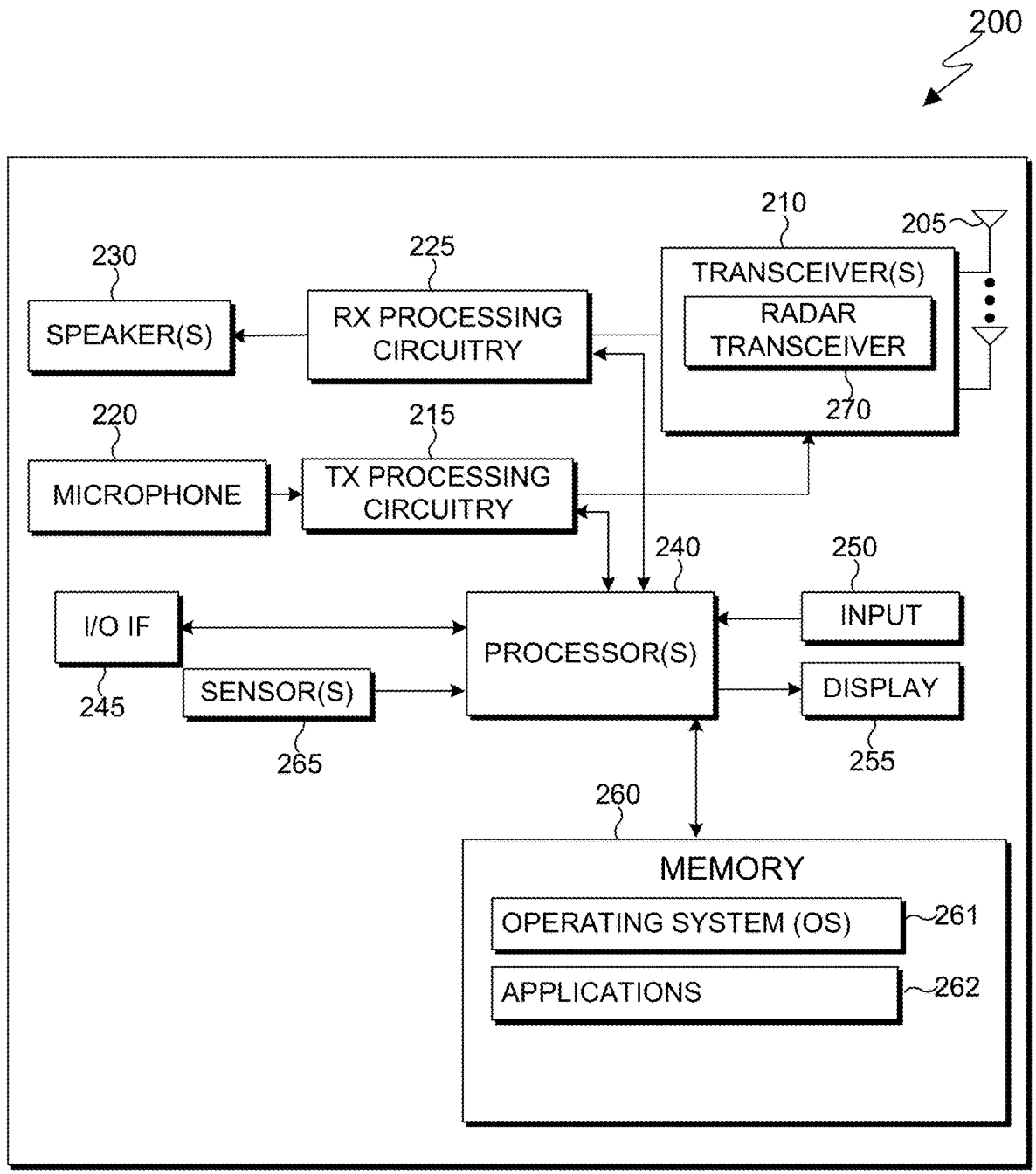
FIG. 2 illustrates an example electronic device according to embodiments of the present disclosure.

FIG. 2 illustrates an example electronic device according to embodiments of the present disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the AR/VR glasses 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figure 3:
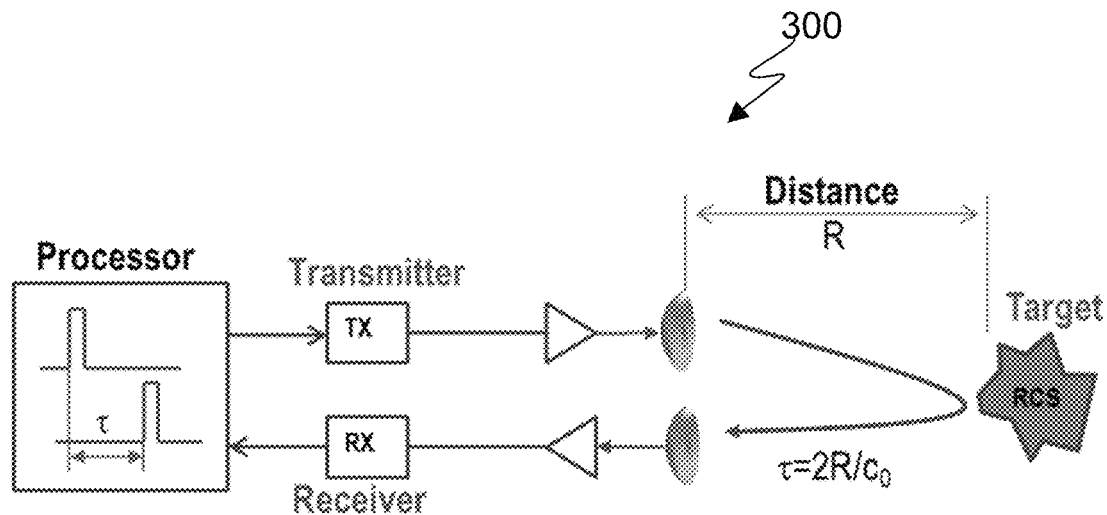
FIG. 3 illustrates an example monostatic radar according to embodiments of the present disclosure.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 3, below, illustrates an example monostatic radar.

In certain embodiments, the radar transceiver 270 can include a transmitter and a receiver. In the radar transceiver 270, the transmitter of can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

A common type of radar is the "monostatic" radar, characterized by the fact that the transmitter of the radar signal and the receiver for its delayed echo are, for all practical purposes, in the same location.

FIG. 3 illustrates an example monostatic radar 300 according to embodiments of the present disclosure. The embodiment of a monostatic radar 300 of FIG. 3 is for illustration only. Different embodiments of a monostatic radar 300 could be used without departing from the scope of this disclosure.

In the example of FIG. 3 a high level architecture is shown for a common monostatic radar, i.e., the transmitter and receiver are co-located, either by using a common antenna, or are nearly co-located, while using separate, but adjacent antennas. Monostatic radars are assumed coherent, i.e., transmitter and receiver are synchronized via a common time reference.

In a monostatic radar's most basic form, a radar pulse is generated as a realization of a desired "radar waveform", modulated onto a radio carrier frequency and transmitted through a power amplifier and antenna (shown as a parabolic antenna), either omni-directionally or focused into a particular direction. Assuming a "target" at a distance R from the radar location and within the field-of-view of the transmitted signal, the target will be illuminated by RF power density $p_t$ (in units of W/m²) for the duration of the transmission. The first order, $p_t$ can be described as:

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2},$$

where:
$P_T$ . . . transmit power [W],
$G_T, A_T$ . . . transmit antenna gain [dBi], effective aperture area [m²],
$\lambda$ . . . wavelength of the radar signal RF carrier signal [m],
R . . . target distance [m].

In this example, effects of atmospheric attenuation, multipath propagation, antenna losses, etc. have been neglected.

The transmit power density impinging onto the target surface will lead to reflections depending on the material composition, surface shape, and dielectric behavior at the frequency of the radar signal. Note that off-direction scattered signals are typically too weak to be received back at the radar receiver, so only direct reflections will contribute to a detectable receive signal. In essence, the illuminated area(s) of the target with normal vectors pointing back at the receiver will act as transmit antenna apertures with directivities (gains) in accordance with their effective aperture area(s). The reflected-back power is:

$$P_{refl} = p_t A_t G_t \sim p_t A_t r_t \frac{A_t}{(\lambda^2/4\pi)} = p_t RCS,$$

where:
$P_{refl}$ . . . effective (isotropic) target-reflected power [W],
$A_t, r_t, G_t$ . . . effective target area normal to the radar direction [m²], reflectivity of the material & shape [0, . . . , 1], and corresponding aperture gain [dBi],
RCS . . . Radar Cross Section [m²].

Note that the radar cross section, RCS, is an equivalent area that scales proportionally to the actual reflecting area-squared, inversely proportionally with the wavelength-squared and is reduced by various shape factors and the reflectivity of the material. For a flat, fully reflecting mirror of area $A_t$, large compared with $\lambda^2$, RCS=$4\pi A_t^2/\lambda^2$. Due to the material and shape dependency, it is generally not possible to deduce the actual physical area of a target from the reflected power, even if the target distance is known.

The target-reflected power at the receiver location results from the reflected-power density at the reverse distance R, collected over the receiver antenna aperture area:

$$P_R = \frac{P_{refl}}{4\pi R^2} A_R = P_T \cdot RCS \frac{A_T A_R}{4\pi \lambda^2 R^4},$$

where:
$P_R$ . . . received, target-reflected power [W],
$A_R$ . . . receiver antenna effective aperture area [m²], may be same as $A_T$.

The radar system is usable as long as the receiver signal exhibits sufficient signal-to-noise ratio (SNR), the particular value of which depends on the waveform and detection method used. Generally, in its simplest form:

$$SNR = \frac{P_R}{kT \cdot B \cdot F},$$

where:
kT . . . Boltzmann's constant x temperature [W/Hz],
B . . . radar signal bandwidth [Hz],
F . . . receiver noise factor (degradation of receive signal SNR due to noise contributions of the receiver circuit itself).

In case the radar signal is a short pulse of duration (width) $T_P$, the delay $\tau$ between the transmission and reception of the corresponding echo will be equal to $\tau=2R/c$, where c is the speed of (light) propagation in the medium (air). In case there are several targets at slightly different distances, the individual echos can be distinguished as such only if the delays differ by at least one pulse width, and hence the range resolution of the radar will be $\Delta R=c\Delta\tau/2=cT_P/2$. Further considering that a rectangular pulse of duration $T_P$ exhibits a power spectral density $P(f)\sim(\sin(\pi f T_P)/(\pi f T_P))^2$ with the first null at its bandwidth $B=1/T_P$, the range resolution of a radar is fundamentally connected with the bandwidth of the radar waveform via:

$$\Delta R = c/2B.$$

Although FIG. 3 illustrates an example of a monostatic radar 300, various changes may be made to FIG. 3. For example, various changes to transmitter, the receiver, the processor, etc. could be made according to particular needs.

Figure 4:
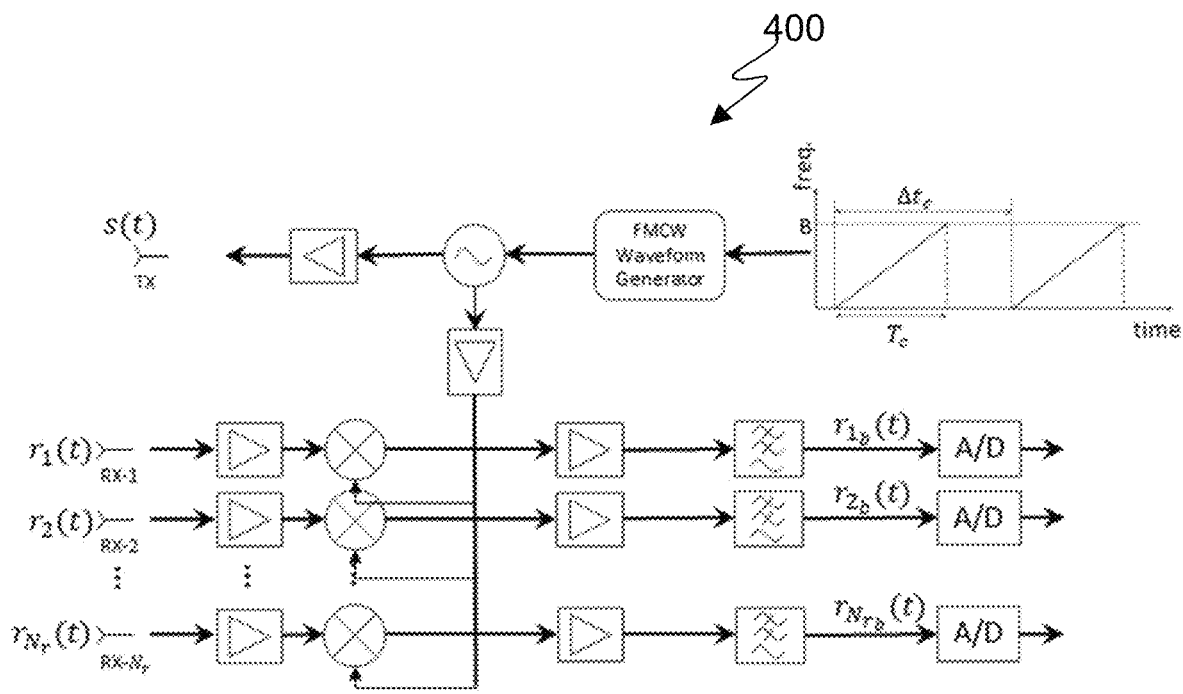
FIG. 4 illustrates an example of a millimeter wave (mm-Wave) monostatic frequency-modulated continuous wave (FMCW) radar according to embodiments of the present disclosure.

FIG. 4 illustrates an example 400 of a mmWave monostatic FMCW radar according to embodiments of the present disclosure. The embodiment of a radar of FIG. 4 is for illustration only. Different embodiments of a radar could be used without departing from the scope of this disclosure.

In the present disclosure, a mmWave monostatic FMCW radar with sawtooth linear frequency modulation is used. Let the operational bandwidth of the radar be $B=f_{min}-f_{max}$, where $f_{min}$ and $f_{max}$ are minimum and maximum sweep frequencies of the radar, respectively. The radar is equipped with a single transmit and $N_r$ receive antennas. The receive antennas form a uniform linear array (ULA) with spacing $d_0=\lambda_{max}/2$, where $\lambda_{max}=c/f_{min}$ and c is the velocity of the light.

As illustrated in FIG. 4, the transmitter transmits a frequency modulated sinusoid chirp of duration $T_c$ over the bandwidth B. Hence, the range resolution of the radar is $r_{min}=c/2B$. In the time domain, the transmitted chirp s(t) is given as $$s(t) = A_T \cos\left(2\pi\left(f_{min}t + \frac{1}{2}St^2\right)\right),$$

where $A_T$ is the transmit signal amplitude and $S=B/T_c$ controls the frequency ramp of s(t). The reflected signal from an object is received at the $N_r$ receive antennas. Let the object, such as a finger or hand, is at a distance $R_0$ from the radar. Assuming one dominant reflected path, the received signal at the reference antenna is given as $$r(t) = A_R \cos\left(2\pi\left(f_{min}(t-\tau) + \frac{1}{2}S(t-\tau)^2\right)\right),$$

where $A_R$ is the amplitude of the reflected signal which is a function of $A_T$, distance between the radar and the reflecting object, and the physical properties of the object. Further, $$\tau = \frac{2R_0}{c}$$

is the round trip time delay to the reference antenna. The beat signal for the reference antenna is obtained by low pass filtering the output of the mixer. For the reference antenna, the beat signal is given as $$r_{b(t)} = \frac{A_T A_R}{2}\cos\left(2\pi\left(f_{min}\tau + S\tau t - \frac{1}{2}S\tau^2\right)\right) \approx \frac{A_T A_R}{2}\cos(2\pi S\tau t - 2\pi f_{min}\tau),$$

where the last approximation follows from the fact that the propagation delay is orders of magnitude less than the chirp duration, i.e., $\tau \ll T_c$. The beat signal has two important parameters, namely the beat frequency $$f_b = S\tau = \frac{S2R_0}{c},$$

and the beat phase $\phi_b = 2\pi f_{min}\tau$. The beat frequency is used to estimate the object range $R_0$. Further, for a moving target, the velocity can be estimated using beat phases corresponding to at least two consecutive chirps. For example, if two chirps are transmitted with a time separation of $\Delta t_c > T_c$, then the difference in beat phases is given as $$\Delta\phi_b = \frac{4\pi\Delta R}{\lambda_{max}} = \frac{4\pi v_0 \Delta t_c}{\lambda_{max}},$$

where $v_0$ is the velocity of the object.

The beat frequency is obtained by taking the Fourier transform of the beat signal that directly gives us the range $R_0$. To do so, the beat signal $r_b(t)$ is passed through an analog to digital converter (ADC) with sampling frequency $F_s = 1/T_s$, where $T_s$ is the sampling period. As a consequence, each chirp is sampled $N_s$ times where $T_c = N_s T_s$. The ADC output corresponding to the n-th chirp is $x_n \in \mathcal{R}^{N_s \times 1}$ and defined as $x_n = [\{x[k, n]\}_{k=0}^{N_s-1}]$, where $x[k, n] = r_b(n\Delta t_c + kT_s)$. Let the $N_s$-point fast Fourier transform (FFT) output of $x_n$ be denoted as $X_n$. Assuming a single object, as has been considered so far, the frequency bin that corresponds to the beat frequency can be obtained as $k^* = \arg\max\|X_n\|^2$. Since the radar resolution is c/2B, the n-th bin of the FFT output corresponds to a target located within [kc/2B−kc/4B, kc/2B+kc/4B] for $1 \leq k \leq N_s - 1$. As the range information of the object is embedded in $X_n$, it is also known as the range FFT.

Although FIG. 4 illustrates an example 400 of a radar, various changes may be made to FIG. 4. For example, various changes to the waveform, the frequency, etc. could be made according to particular needs.

Figure 5:
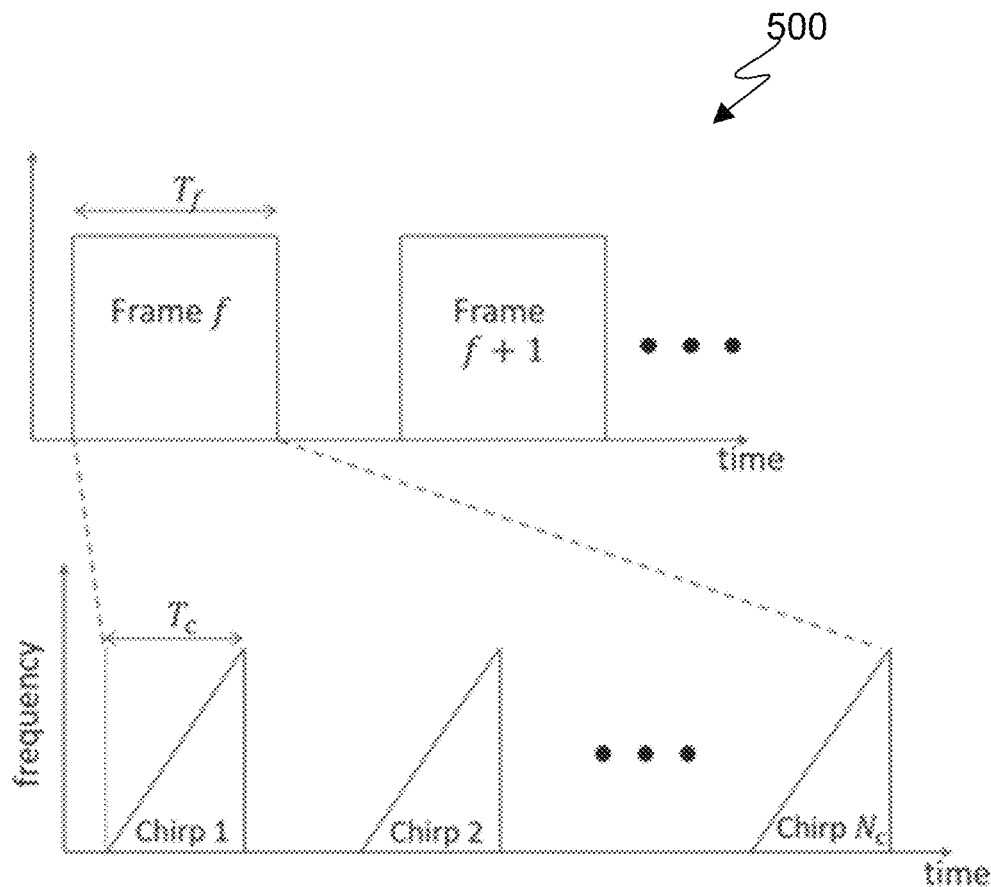
FIG. 5 illustrates an example of a radar transmission timing structure according to embodiments of the present disclosure.

FIG. 5 illustrates an example 500 of a radar transmission timing structure according to embodiments of the present disclosure. The embodiment of a radar transmission timing structure of FIG. 5 is for illustration only. Different embodiments of a radar transmission timing structure could be used without departing from the scope of this disclosure.

To facilitate velocity estimation, the present application adopts a radar transmission timing structure as illustrated in FIG. 5. In the example of FIG. 5, the radar transmissions are divided into frames, where each frame consists of $N_c$ equally spaced chirps. The range FFT of each chirp gives us the phase information on each range bin. For a given range bin, the Doppler spectrum, which has the velocity information, is obtained by applying $N_c$-point FFT across the range FFTs of chirps corresponding to that range bin. The range-Doppler map (RDM) is constructed by repeating the above step for each range bin. Mathematically $R \in \mathcal{C}^{N_c \times N_s}$ as $R = [X_0, X_1, \ldots, X_{N_c-1}]^T$ is defined. The RDM M is obtained by taking $N_c$-point FFT across all the columns of R. The minimum velocity that can be estimated corresponds to the Doppler resolution, which is inversely proportional to the number of chirps $N_c$ and is given as $$v_{min} = \frac{\lambda_{max}}{2N_c T_c}.$$

Further, the maximum velocity that can be estimated is given by $$v_{max} = \frac{N_c}{2}v_{min} = \frac{\lambda_{max}}{4T_c}.$$

Although FIG. 5 illustrates an example 500 of a radar transmission timing structure, various changes may be made to FIG. 5. For example, various changes to the waveform, the frequency, etc. could be made according to particular needs.

Since the present application considers a monostatic radar, the RDM obtained using the above-mentioned approach has significant power contributions from direct leakage from the transmitting antenna to the receiving antennas. Further, the contributions from larger and slowly moving body parts such as the fist and forearm can be higher compared to the fingers. Since the transmit and receive antennas are static, the direct leakage appears in the zero-Doppler bin in the RDM. On the other hand, the larger body parts such as the fist and forearm move relatively slowly compared to the fingers. Hence, their signal contributions mainly concentrate at lower velocities. Since the contributions from both these artifacts dominate the desired signal in the RDM, it is better to remove them using appropriate signal processing techniques. The static contribution from the direct leakage is simply removed by nulling the zero-Doppler bin. To remove the contributions from slowly moving body parts, the sampled beat signal of all the chirps is passed in a frame through a first-order infinite impulse response (IIR) filter. For the reference frame f, the clutter removed samples corresponding to all the chirps can be obtained as $$\hat{x}_f[k, n] = x_f[k, n] - \overline{y_f}[k, n-1]$$
$$\overline{y_f}[k, n] = \alpha x_f[k, n] + (1-\alpha)\overline{y_f}[k, n-1],$$

$$\text{for } 0 \le k \le N_s - 1, 0 \le n \le N_c - 1,$$

where $\overline{y_f}[k, n]$ has contributions from all previous samples of different chirps in the frame.

The following notation is used throughout the present disclosure. Bold lowercase x is used for column vectors, bold uppercase X is used for matrices, non-bold letters x, X are used for scalars. Superscript T and * represent the transpose and conjugate transpose respectively. The fast Fourier transform (FFT) output of a vector x is denoted as X. The N×N identity matrix is represented by $I_N$, and the N×1 zero vector is $0_{N \times 1}$. The set of complex and real numbers are denoted by $\mathcal{C}$ and $\mathcal{R}$, respectively.

Figure 6:
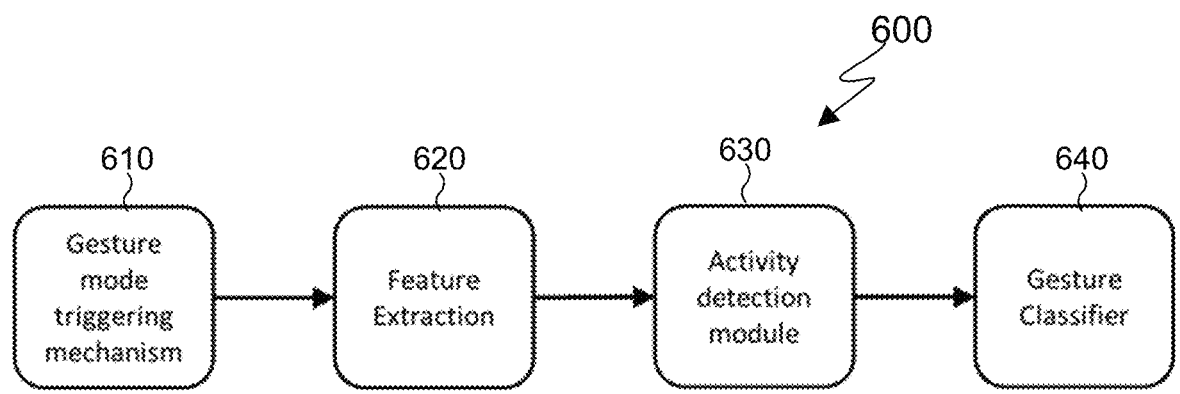
FIG. 6 illustrates an example system diagram for a radar-based gesture recognition solution according to embodiments of the present disclosure.

FIG. 6 illustrates an example system diagram 600 for a radar-based gesture recognition solution according to embodiments of the present disclosure. The embodiment of a radar-based gesture recognition solution of FIG. 6 is for illustration only. Different embodiments of a radar-based gesture recognition solution could be used without departing from the scope of this disclosure.

In the example of FIG. 6, the processing pipeline includes a gesture mode triggering mechanism 610. Gesture mode triggering mechanism 610 may be implemented in multiple ways, e.g., based on proximity detection and/or active applications, etc. In proximity detection-based trigger, the gesture mode may be activated only when an object in close proximity to the radar is detected. The benefit of triggering the gesture mode based on proximity detection may result in reduced power consumption as it is expected that a simpler task of proximity detection can be achieved reliably with radar configurations that have lower power consumption. Once the gesture mode is triggered, the incoming raw data is processed at block 620 (i.e., "feature extraction") to get features such as time-velocity diagram (TVD), time-angle diagram (TAD). The activity detection module (ADM) 630, which may be signal processing-based or machine-learning solution, takes the extracted features into account to declare the end of an activity. After the activity end declaration, the gesture classifier (GC) 640 takes the necessary input features to classify the activity performed by the user.

Although FIG. 6 illustrates an example system diagram 600 for a radar-based gesture recognition solution, various changes may be made to FIG. 6. For example, various changes to the processing pipeline could be made, various blocks could be omitted or operate in parallel, etc. according to particular needs.

In an ideal scenario where the user only performs gesture activities, a properly trained ADM and gesture classifier should be able to classify the gesture activities with high accuracy. However, in practice, there may be many unintentional non-gesture activities performed by the user. In such scenarios, for robust operation, the GRM should be able to reject the non-gesture activities. Non-gestures, in general, are difficult to deal with due to their undefined nature. A brute force approach using machine learning would be to collect various non-gesture samples and retrain ADM and/or the gesture classifier. Due to the undefined nature of non-gestures, not only is it difficult to define non-contrived scenarios for data collection, but the required number of samples could be huge. Contrary to a pure brute force approach, the present disclosure describes signal processing approaches that exploit the signature of the desired gestures set to separate a large class of non-gestures from the desired gestures. Several major benefits include:

Efficient non-gesture rejections: The disclosed signal processing solution has low complexity and can reject a large group of non-gesture activities that do not have signature matching to the desired gesture set.

Helpful in reducing power consumption: The disclosed solution can detect non-gesture activities before calling complex module such as the gesture classifier. By helping reduce the number of calls to subsequent complex modules in the processing chain due to non-gestures, it can help save the overall power consumption of the gesture recognition solution.

Robust and tunable to new gestures set: Being a signal processing solution, all processing steps are interpretable and have clear physical meaning unlike a black box machine learning approach. Since each of the steps are well defined, they can be easily tuned to a new gesture set.

In the present disclosure, signal processing-based non-gesture rejection methods after the ADM and the gesture classifier are introduced. Specifically, a burst concept is introduced that can be used to decompose an activity into a sequence of bursts, much like a sentence in natural language can be decomposed into words. A burst can be considered as a part of motion that constitutes an activity, and a burst can be defined for different physical measurements (e.g., range, speed, angle, etc.). The extracted burst sequence of an activity provides a signature for that activity. By deriving the burst sequence of desired gestures, signatures of a gesture vocabulary are established, and those signatures can be used to reject non-gestures.

The disclosed non-gesture rejection solution can be implemented at various stages of the processing chain of a gesture recognition solution. Particularly, in the present disclosure, focuses on two stages: after the ADM but before the gesture classifier (i.e., post-ADM) and after the gesture classifier (i.e., post-GC). The present methods, related to post-ADM non-gesture rejection, determine if the physical attributes associated with the gesture vocabulary are present in the detected activity by the ADM. In the post-GC non-gesture rejection, it is checked if the physical attributes associated with the particular gesture are met. The first step focuses on a coarser set of attributes. In contrast, the second step focuses on a finer set of attributes that are specific to the predicted gesture. Some highlights of the present disclosure are as follows:

1. One of the embodiments outlines an iterative process to select a set of candidate gestures by defining them in terms bursts and then refine the appropriate burst attribute thresholds so that a target non-gesture rejection criteria is met.

2. An embodiment to identify a set of features that may be more effective in separating the gesture activities from non-gesture activities using simple signal processing-based methods. These features, namely radial velocity, azimuth angular velocity, and elevation angular velocity, capture the motion of the user's hand/finger in the three orthogonal spatial dimensions. Each feature is divided into a set of bursts, where each burst has a few attributes such as burst sign, burst length, burst area, and burst height.
3. In the post-ADM non-gesture rejection methods, based on the physical attributes of the bursts, a set of rules is proposed to identify non-gesture activities. These set of rules may use the fact that the gestures in the vocabulary should have a predefined number of bursts, the gestures burst pattern should have a predefined sign changes, and the area of opposite burst signs may be approximately equal.
4. In the post-GC non-gesture rejection methods, more gesture specific rules are presented to reject non-gestures. One such rule is to exploit the correlation in the temporal variations of the radial and the azimuth angular velocity features to reject a potential non-gesture. Another rule is based on comparison of azimuth and elevation angular burst areas to reject a non-gesture that may be incorrectly predicted by the gesture classifier.

Figure 7:
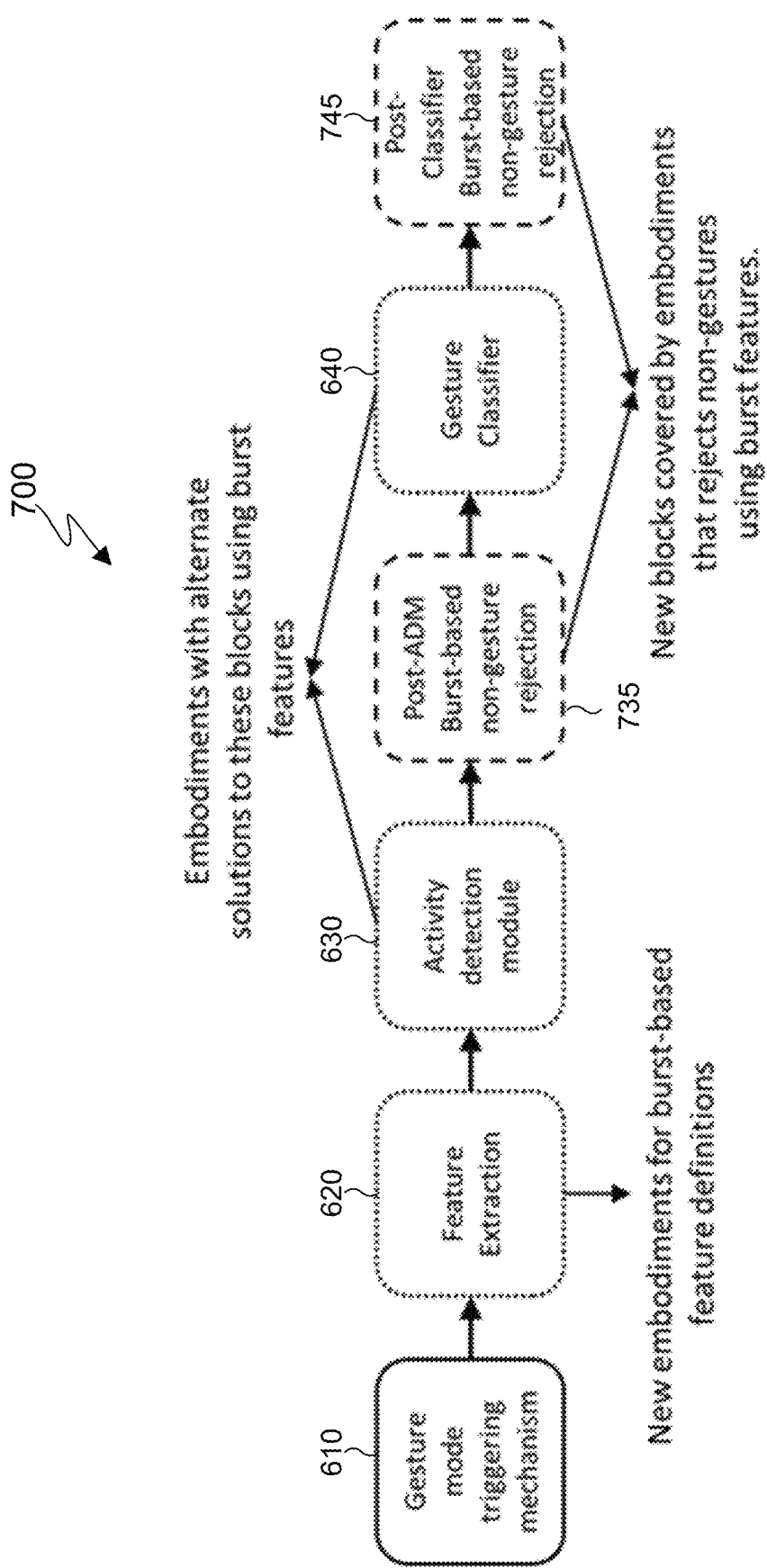
FIG. 7 illustrates an example system diagram for a radar-based gesture recognition solution according to embodiments of the present disclosure.

FIG. 7 illustrates an example system diagram 700 for a radar-based gesture recognition solution according to embodiments of the present disclosure. The embodiment of a radar-based gesture recognition solution of FIG. 7 is for illustration only. Different embodiments of a radar-based gesture recognition solution could be used without departing from the scope of this disclosure.

The example of FIG. 7 highlights blocks described with respect to FIG. 6 that are affected by the embodiments presented in the present disclosure. A first embodiment mentioned above modifies the feature extraction block 620 to obtain the burst features. A second embodiment introduces a new block 735 to reject non-gesture activities after the ADM 630 and before the classifier 640. A third embodiment introduces a new block 745 to reject non-gesture activities after the classifier. Moreover, alternate embodiments are presented for burst-based ADM and classifier implementation.

Although FIG. 7 illustrates an example system diagram 700 for a radar-based gesture recognition solution, various changes may be made to FIG. 7. For example, various changes to the processing pipeline could be made, various blocks could be omitted or operate in parallel, etc. according to particular needs.

Although the set of rules proposed in this disclosure are specific to a particular type of gestures, the rules can be readily modified to accommodate any other types of gestures as well.

One embodiment of the present disclosure is a process to define a set of gestures that can be easily identified using the burst attributes such as number of bursts, burst area, burst sign, burst length, and burst height. Moreover, the gestures in the vocabulary may also share some burst-related common features so that a simpler set of rules can be developed to separate the gestures from the non-gestures. For example, if an activity consists of a set of bursts that is more than a predefined number, then this activity can be a potential non-gesture. The thresholds corresponding to different attributes may be obtained using a data driven approach.

Figure 8:
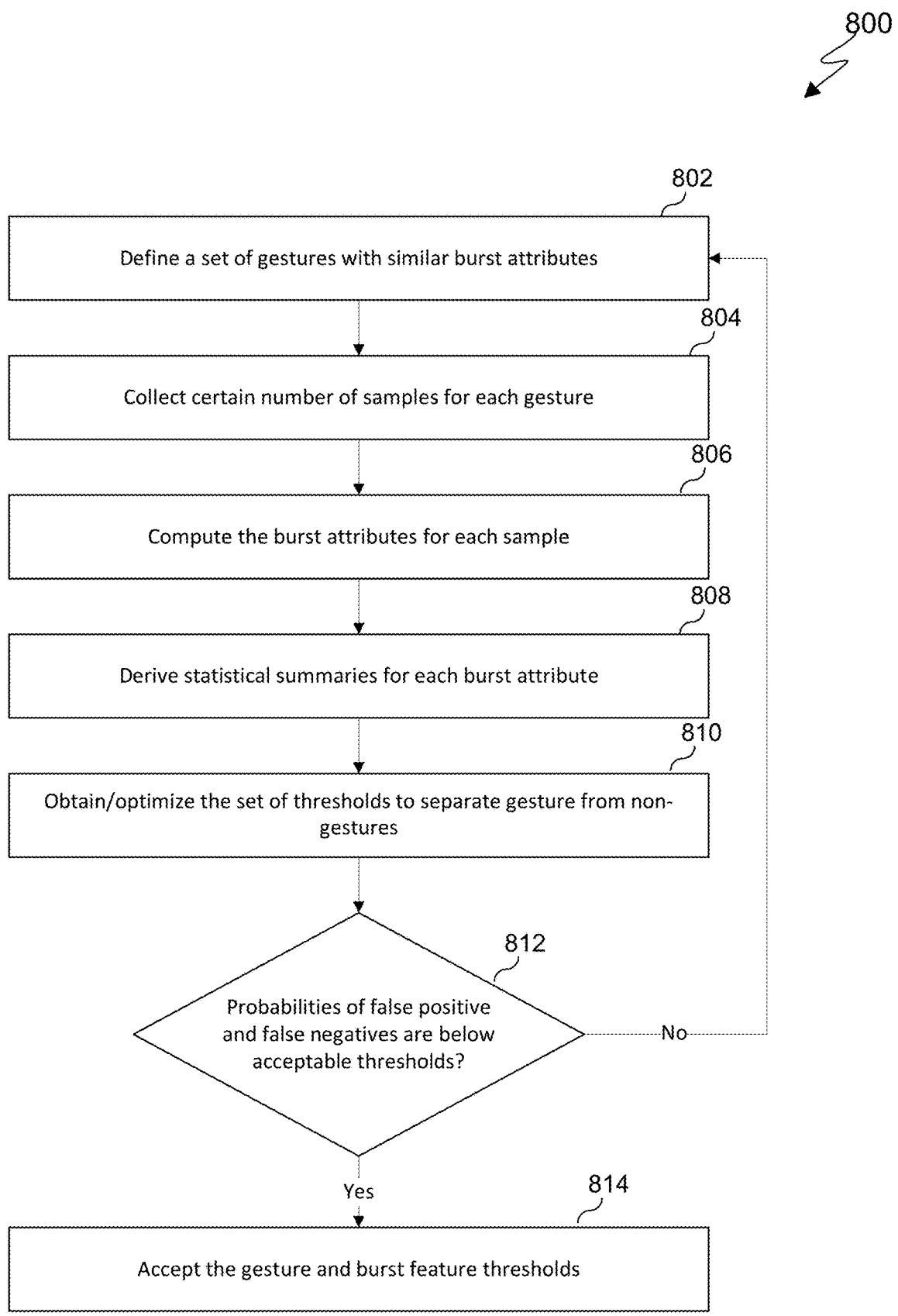
FIG. 8 illustrates a process to define a set of gestures according to embodiments of the present disclosure.

FIG. 8 illustrates a process 800 to define a set of gestures according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of a process 800 to define a set of gestures could be used without departing from the scope of this disclosure.

As illustrated in FIG. 8, the process 800 begins at step 802. At step 802, a set of gestures with similar burst attributes is defined. At step 804, a certain number of samples are collected for each gesture. At step 806, the burst attributes for each sample are computed. At step 808, statistical summaries for each burst attribute are derived. At step 810, a set of thresholds to separate gestures from non-gestures is obtained and/or optimized. At step 812, a determination is made whether the probabilities of false positives and false negatives are below acceptable thresholds. If the determination is negative, the process reverts back to step 802. If the determination is positive, the process proceeds to step 814. Finally, at step 814, the gesture and burst feature thresholds are accepted.

Although FIG. 8 illustrates one example of a process 800 to define a set of gestures, various changes may be made to FIG. 8. For example, while shown as a series of steps, various steps in FIG. 8 could overlap, occur in parallel, occur in a different order, or occur any number of times.

Figure 9:
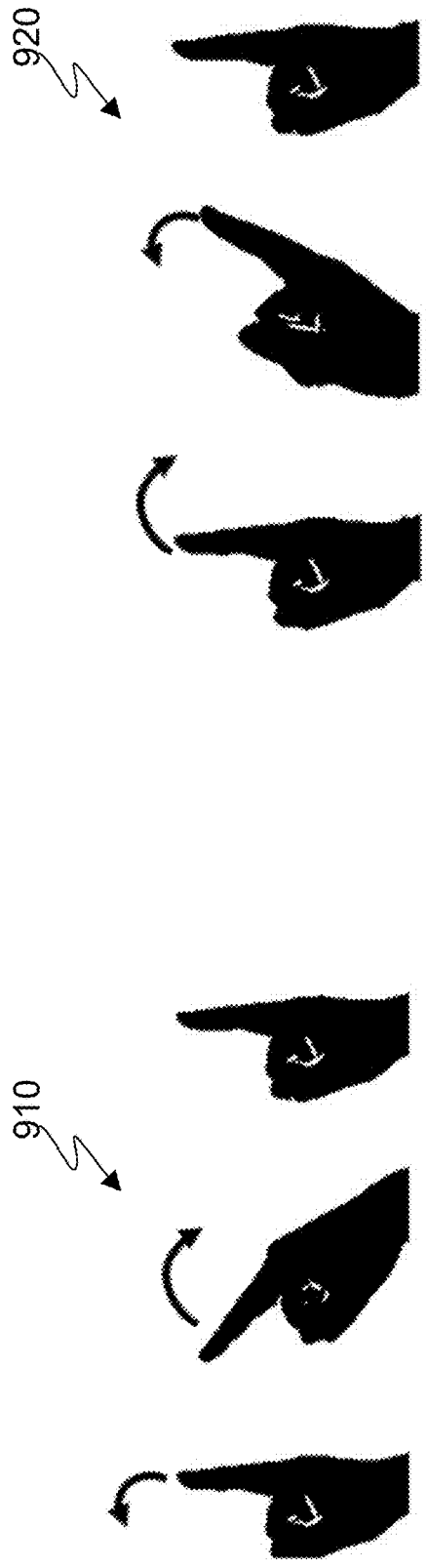
FIG. 9 illustrates examples of gestures according to embodiments of the present disclosure.
Figure 9:
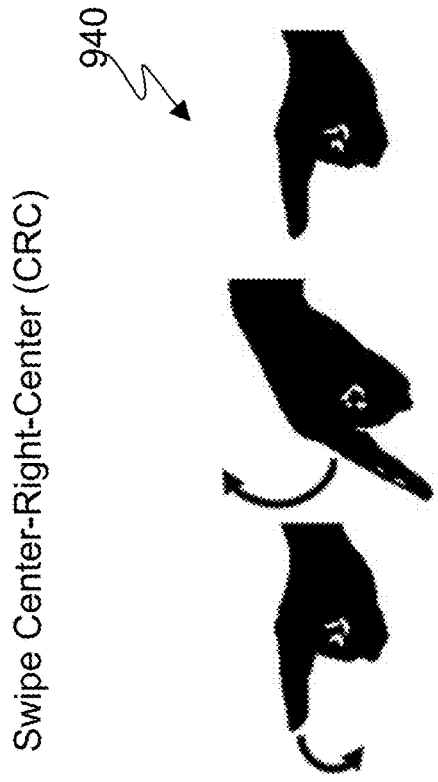
Figure 9:
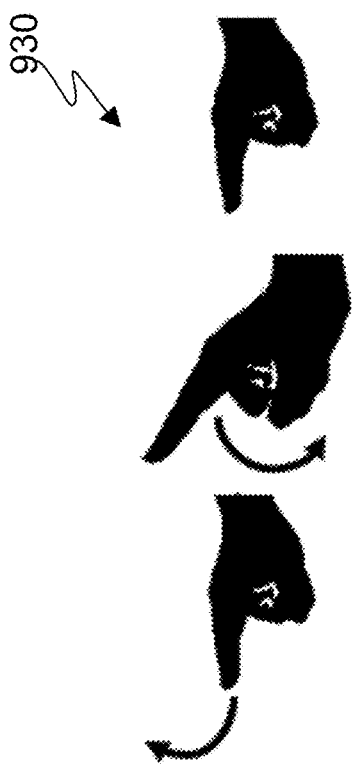

While the process of FIG. 8 may be applied to define any other set of desirable gestures, for a simpler exposition of the embodiments presented in the present disclosure, four gestures are used as illustrated in FIG. 9.

FIG. 9 illustrates examples 910, 920, 930, and 940 of gestures according to embodiments of the present disclosure. The embodiment of gestures of FIG. 9 is for illustration only. Different embodiments of a radar-based gesture recognition solution could be used without departing from the scope of this disclosure.

In the example of FIG. 9, the following four gestures are used: Swipe Center-Left-Center (CLC) 910, swipe center-right-center (CRC) 920, swipe center-up-center (CUC) 930, and swipe center-down-center (CDC) 940.

These set of gestures share the following burst attributes:
1. In the ideal scenario, where the start and end position of the gesture is the radar boresight, this should result in two bursts (as per the definition of burst herein, which is discussed later below).
2. Further, these two bursts should have opposite signs for all velocity features, e.g., for the radial velocity feature the first burst will have a negative Doppler (since the finger moves away from the radar) while the second burst will have a positive Doppler spectrum (as the finger is moving towards the radar).
3. In the ideal scenario, each burst should have a similar area.

These attributes may be exploited to reject any potential non-gesture. In the real world, when the user performs the gesture, a departure from the aforementioned ideal burst attributes is expected, e.g., for some gestures instead of two relatively larger bursts a few smaller bursts may be encountered. Further, the bursts of the opposite signs may not have equal areas. Hence, to come up with appropriate thresholds for different burst attributes, a data-driven approach may be necessary to accurately identify the non-gestures. The set of thresholds can be iteratively optimized and if necessary revisit the choice of the gesture set until an acceptable balance is maintained between non-gesture rejection rate and missed detection probability of a valid gesture.

Although FIG. 9 illustrates examples 910, 920, 930, and 940 of gestures, various changes may be made to FIG. 9. For example, various changes to the type of gestures, the number of gestures, the motion of the gestures etc. could be made according to particular needs.

Figure 10:
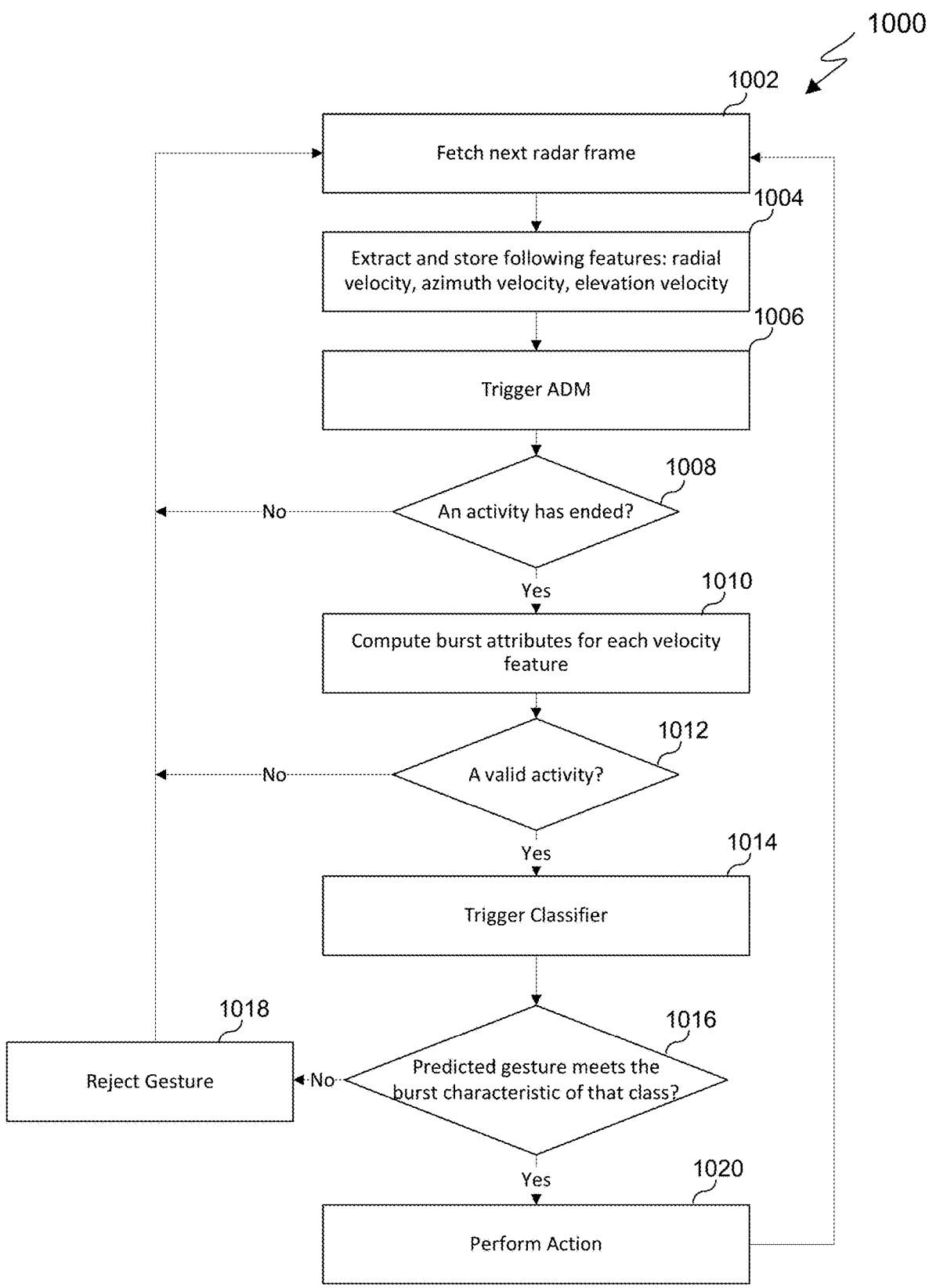
FIG. 10 illustrates a process to reject non-gestures based on burst-based gating methods according to embodiments of the present disclosure.

FIG. 10 illustrates a process 1000 to reject non-gestures based on burst-based gating methods according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of a process 1000 to reject non-gestures based on burst-based gating methods could be used without departing from the scope of this disclosure.

In the example of FIG. 10 a process flow is presented for a gesture classification system with the ability to reject non-gestures based on the burst-based gating methods discussed later in the present disclosure. In this example, the implicit assumption is that the gesture set and the appropriate burst thresholds for non-gesture rejection at different stages is already obtained using the process in FIG. 8 or similar. During each radar frame (1002), velocity features are extracted (1004) for the three orthogonal dimensions, namely radial, azimuth, and elevation. After the velocity feature extraction, the activity (end) detection module (ADM) is triggered (1006) to check if an activity has ended. The ADM can be a simple signal processing based block that takes into account the energy on each frame to declare the end of an activity. Alternatively, it could be a machine learning (ML) based module trained on the collected data. Once the ADM ascertains that the activity has ended (1008), the burst attributes for each velocity feature may be computed (1010). Then using a set of rules, it is determined if the activity in the past few frames may contain a valid gesture and accordingly decide to either pass it through gesture classifier or reject the activity (1012). The gesture classifier (1014) can be ML based. Once the predicted gesture is available, the gesture's burst characteristics are analyzed (1016) and compared to decide whether the gesture should be accepted (1020) or rejected (1018).

Although FIG. 10 illustrates one example of a process 1000 to reject non-gestures based on burst-based gating methods, various changes may be made to FIG. 10. For example, while shown as a series of steps, various steps in FIG. 10 could overlap, occur in parallel, occur in a different order, or occur any number of times.

Velocity Feature Extraction: (Block 1004 in FIG. 10)

In the example of FIG. 10, in each frame the first task is to obtain the velocity features corresponding to three orthogonal spatial dimensions. To estimate the radial velocity, the information in each column of a time-velocity diagram (TVD) may be used, where each column corresponds to the Doppler spectrum of the target for a given frame. Further, for the estimation of azimuth and elevation tangential velocities, time-angle diagrams of the respective dimensions may be used. Alternatively, depending on the separation among antennas, interferometric principles may also be used to obtain the average tangential velocities. For a given frame, the process of determining these velocities are outlined next.

Radial velocity estimation: Consider that a frame includes $N_c$ number of pulses where each radar pulse provides one measurement of the channel impulse response (CIR), which includes $N_s$ delay bins (or equivalently range bin). The power in each bin of the Range-Doppler map (RDM) $R_M \in \mathbb{R}^{N_c \times N_s}$ is obtained by first taking the discrete Fourier transform (DFT) across pulses. Next the power on each bin is computed by taking the square of the absolute value of the complex number on each bin. Another intermediate quantity of interest that is derived from the RDM is the range profile $r_p \in \mathbb{R}^{N_s}$, which is defined as $$r_p[j] = \sum_{i=1}^{N_c} R_M[i, j], \text{ for } j = 1, 2, \ldots, N_s.$$

This RDM and range profile may be obtained using the data from all the antennas that are used in the sensing system. Once the range profile is obtained, the distance is estimated by the following equation:

$$d_{est} = C_d \frac{1}{\sum_{k=max(0,n-1)}^{min(n+1,N_s)} r_p[k]} \sum_{k=max(0,n-1)}^{min(n+1,N_s)} k r_p[k],$$

where the target peak is located at the n-th range bin and $C_d$ is the distance resolution. The distance can also be estimated using appropriate interpolation method such as sinc or parabolic or successive parabolic interpolation. For example, if the peak is located at the n-th range bin, then sinc or parabolic functions could be used along with the range profile values between the range bin n−1 to n+1 to estimate the target distance. The estimated distance is later used for determining the azimuth and elevation tangential velocities.

To estimate the radial velocity, the information in the n-th column of $R_M$ may be used (assuming the range profile peak is located at the n-th column). In order to avoid amplifying noise, the elements in $R_M[:, n]$ may be set, which represents the n-th column of $R_M$, that are below the noise threshold $T_{noise}$ to zero, i.e., $$R_M[r, n] = \begin{cases} R_M[r, n], & \text{if } R_M[r, n] > T_{noise} \\ 0, & \text{if } R_M[r, n] \leq T_{noise} \end{cases}.$$

Now, the average estimated radial velocity of the target is given as $$v_{est} = C_v \frac{1}{\sum_{r=-\frac{N_c}{2}}^{\frac{N_c}{2}-1} R_M[r, n]} \sum_{r=-\frac{N_c}{2}}^{\frac{N_c}{2}-1} r R_M[r, n].$$

The estimated velocity of the target for this particular frame is added to a first-in-first-out (FIFO) buffer $v_r$ that holds the radial velocity feature.

Azimuth and elevation tangential velocity estimation: Using the data available at multiple antennas and the knowledge of the peak where the target is located, the angular power spectrum of the target may be estimated using an appropriate spectrum estimation method such as DFT or MUSIC algorithm. For each frame, the azimuth and elevation angular power spectrums are stored in time-azimuth-angle-diagram (TAD) and time-elevation-angle-diagram (TED), respectively. Both of these variables are two dimensional matrices where each column holds the estimated angular spectrum for a given frame. To estimate the average angular velocity of the target in azimuth/elevation dimension, information regarding the angular location of the target over two consecutive frames is needed. Let TAD $[:, f] \in \mathbb{R}^{N_g}$ denote the TAD column corresponding to the f-th frame and $N_g$ is the grid size. For this column, the target angle is obtained as the peak of the angle spectrum for the column f.

$$\hat{\theta}[f] = \mathrm{argmax}\ TAD[:, f]$$

Alternately, $\hat{\theta}[f]$ may also be estimated as $$\hat{\theta}[f] = \sum_{i=1}^{N_c} \theta_i\ TAD[i, f].$$

Similarly, the elevation angular location $\hat{\phi}[f]$ for the frame f may be estimated. The estimated azimuth and elevation angles are stored in respective FIFO buffers denoted as $\Theta$ and $\Phi$. In some scenarios, such as low signal-to-noise ratio or in presence of reflection from many points from the fist/hand of the user, $\hat{\theta}[f]$ and $\hat{\phi}[f]$ may not give the accurate angular location of the desired target, i.e., finger. In such scenarios, it may be advantageous to have a moving average for the estimation of these quantities.

Once the information regarding the angular location for the current and past frames are available, the angular velocity may be estimated using the following procedure. First the change in angle between two consecutive frames is determined. For the azimuth case, consider $\Delta_\theta[f] = \hat{\theta}[f] - \hat{\theta}[f-1]$. Let the estimated distance of the target between these two frames be $d_{est}[f]$. This can be the average of the target distance between these two frames. Alternatively, a moving average of the target distance over past few frames can also be used for $d_{est}[f]$. Now, the tangential displacement of the target between these two frames is given as $d_{tan}^{az}[f] = d_{est}[f] \Delta_\theta[f]$. Using the information on the frame separation period $T_f$, the azimuth tangential velocity for this particular frame may be estimated as $$v_{az}[f] = \frac{d_{tan}^{az}[f]}{T_f}.$$

Following the similar process, the elevation tangential velocity may be estimated as $$v_{el}[f] = \frac{d_{tan}^{el}[f]}{T_f},$$

where $d_{tan}^{el}[f]$ is the tangential displacement of the target between frame f and f−1. Both the estimated quantities $v_{az}[f]$ and $v_{el}[f]$ are stored in respective FIFO buffers denoted as $v_{az}$ and $v_{el}$. The process of velocity feature extraction is outlined in FIG. 11. A few illustrative examples for feature extraction using the above process are presented in FIGS. 12, 13, and 14 for the four different types of swipes described earlier, namely CLC, CRC, CUC, and CDC.

Figure 11:
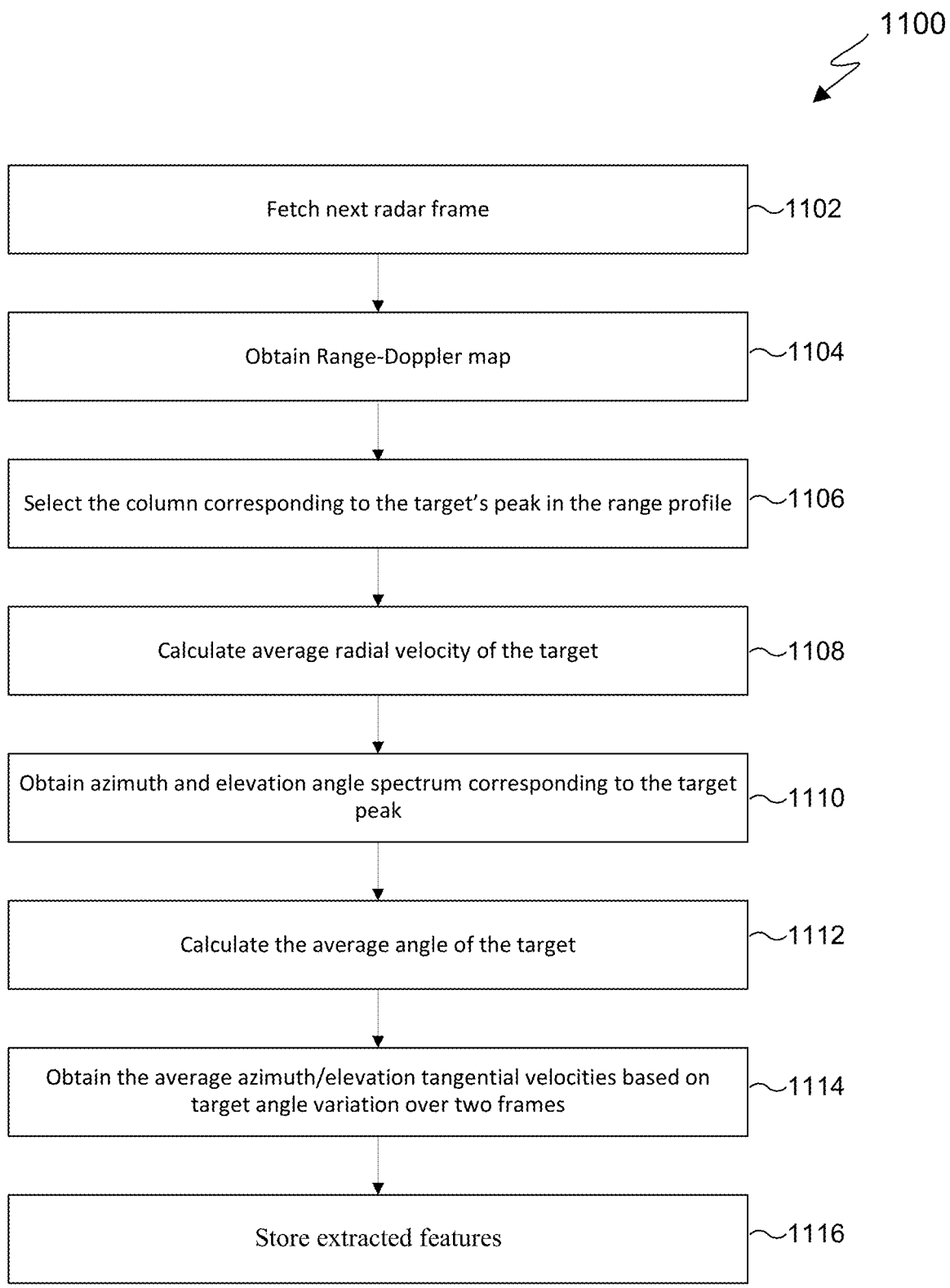
FIG. 11 illustrates a process for velocity feature extraction according to embodiments of the present disclosure.

FIG. 11 illustrates a process 1100 for velocity feature extraction according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments of a process 1100 for velocity feature extraction based on burst-based gating methods could be used without departing from the scope of this disclosure.

As illustrated in FIG. 11, the process 1100 begins at step 1102. At step 1102, The next radar frame is fetched. At step 1104, a Range-Doppler map is obtained. At step 1106, the column corresponding to the target's peak in the range profile is selected. At step 1108, the average radial velocity of the target is calculated. At step 1110, the azimuth and elevation angle spectrum corresponding to the target peak is obtained. At step 1112, the average angle of the target is calculated. At step 1114, the average azimuth/elevation tangential velocities based on target angle variation over two frames is obtained. Finally, at step 1116, the extracted features are stored.

Although FIG. 11 illustrates one example of a process 1100 for velocity feature extraction, various changes may be made to FIG. 11. For example, while shown as a series of steps, various steps in FIG. 11 could overlap, occur in parallel, occur in a different order, or occur any number of times.

Figure 12:
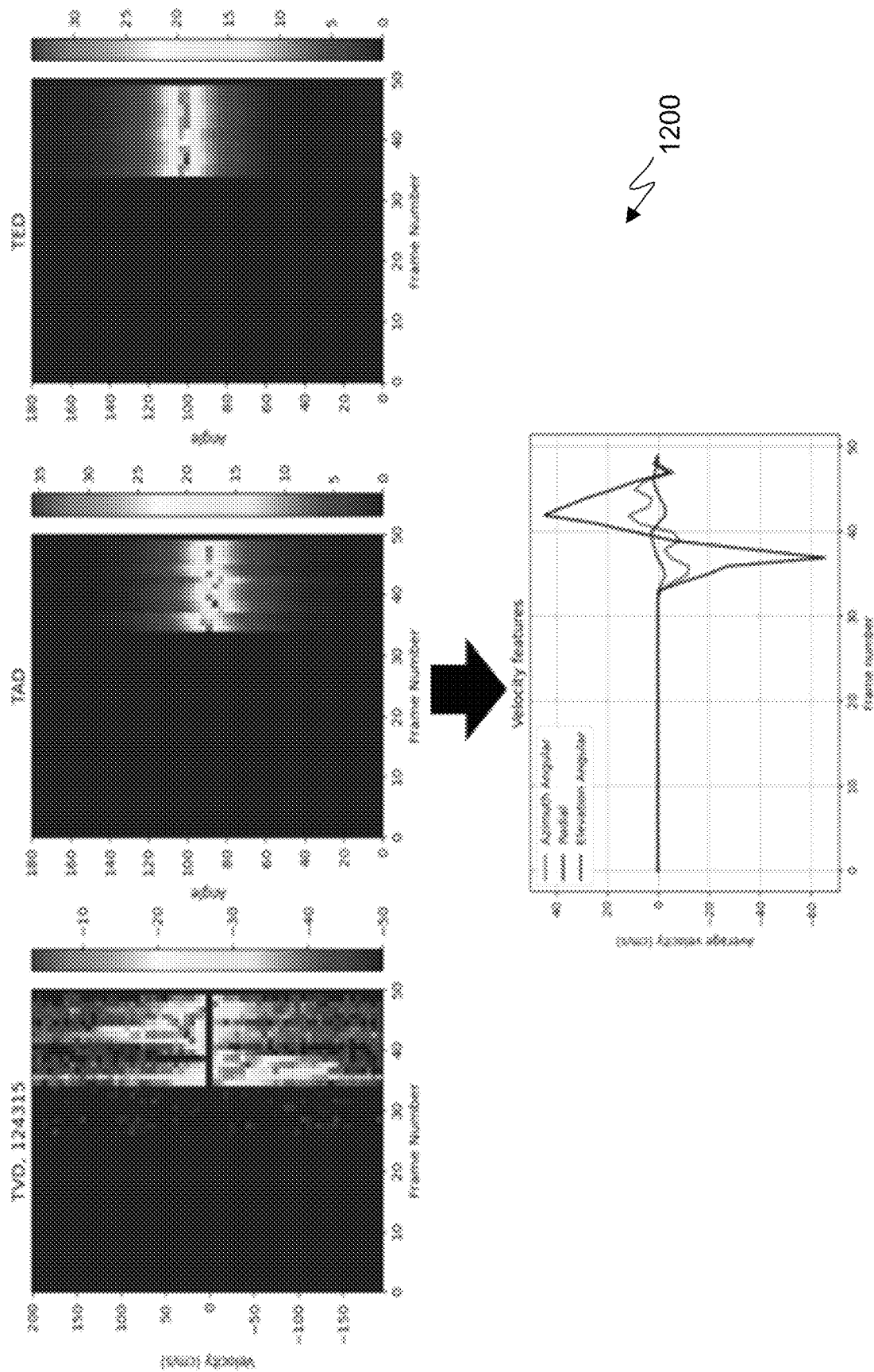
FIG. 12 an example of extracted velocity features according to embodiments of the present disclosure.

FIG. 12 illustrates an example 1200 of extracted velocity features according to embodiments of the present disclosure. The embodiment of extracted velocity features of FIG. 12 is for illustration only. Different embodiments of extracted velocity features could be used without departing from the scope of this disclosure.

In the example of FIG. 12, extracted velocity features and corresponding TVD, TAD, and TED for Swipe center-left-center (CLC) gesture are illustrated. It can be observed in the example of FIG. 12 that the radial velocity feature is significantly more prominent compared to azimuth and elevation features. Further, as expected, there is slightly more variation in the azimuth tangential velocity compared to elevation tangential velocity as the gesture is performed in the azimuth plane.

Although FIG. 12 illustrates an example 1200 of extracted velocity features, various changes may be made to FIG. 12. For example, various changes to the velocity, the angle, etc. could be made according to particular needs.

Figure 13:
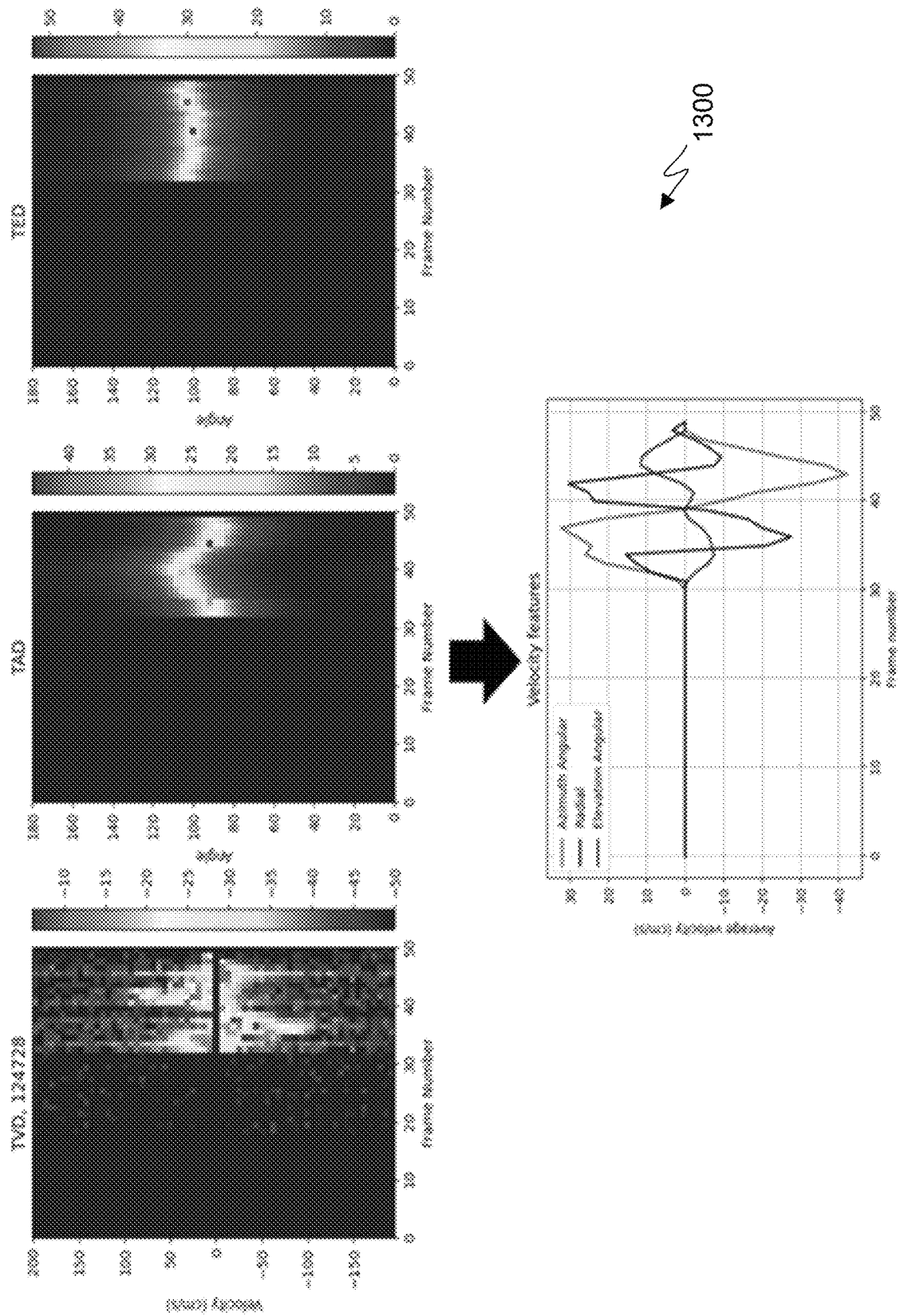
FIG. 13 an example of extracted velocity features according to embodiments of the present disclosure.

FIG. 13 illustrates an example 1300 of extracted velocity features according to embodiments of the present disclosure. The embodiment of extracted velocity features of FIG. 13 is for illustration only. Different embodiments of extracted velocity features could be used without departing from the scope of this disclosure.

In the example of FIG. 13, extracted velocity features and corresponding TVD, TAD, and TED for Swipe center-right-center (CRC) gesture are illustrated. In this case, the variation in azimuth tangential velocity is significantly greater compared to elevation tangential velocity. Further, elevation tangential speed is also greater compared to the radial speed.

Although FIG. 13 illustrates an example 1300 of extracted velocity features, various changes may be made to FIG. 13. For example, various changes to the velocity, the angle, etc. could be made according to particular needs.

Figure 14:
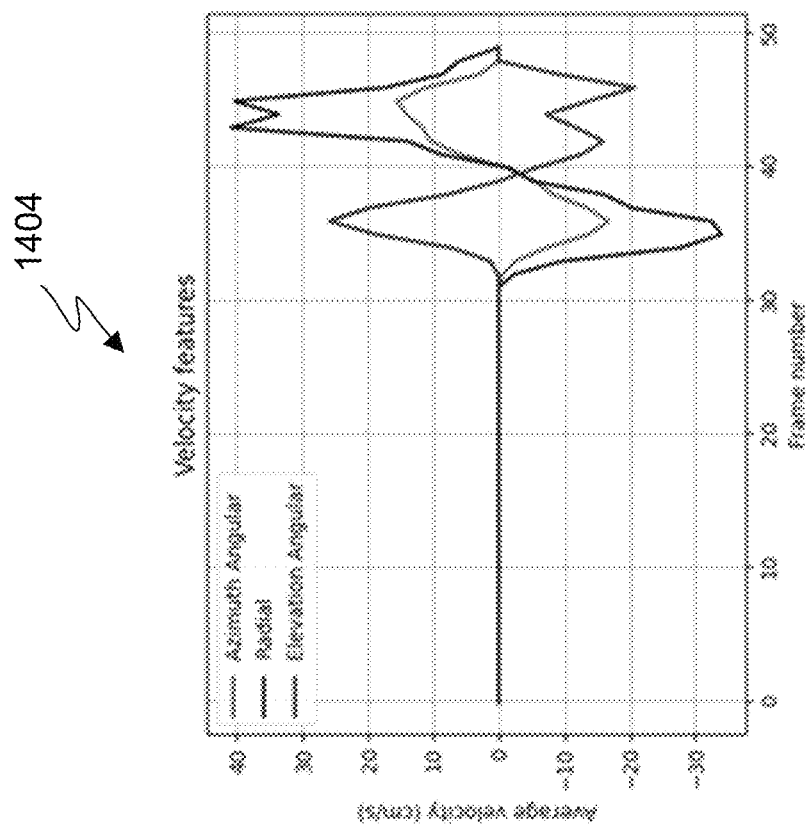
FIG. 14 examples of extracted velocity features according to embodiments of the present disclosure.
Figure 14:
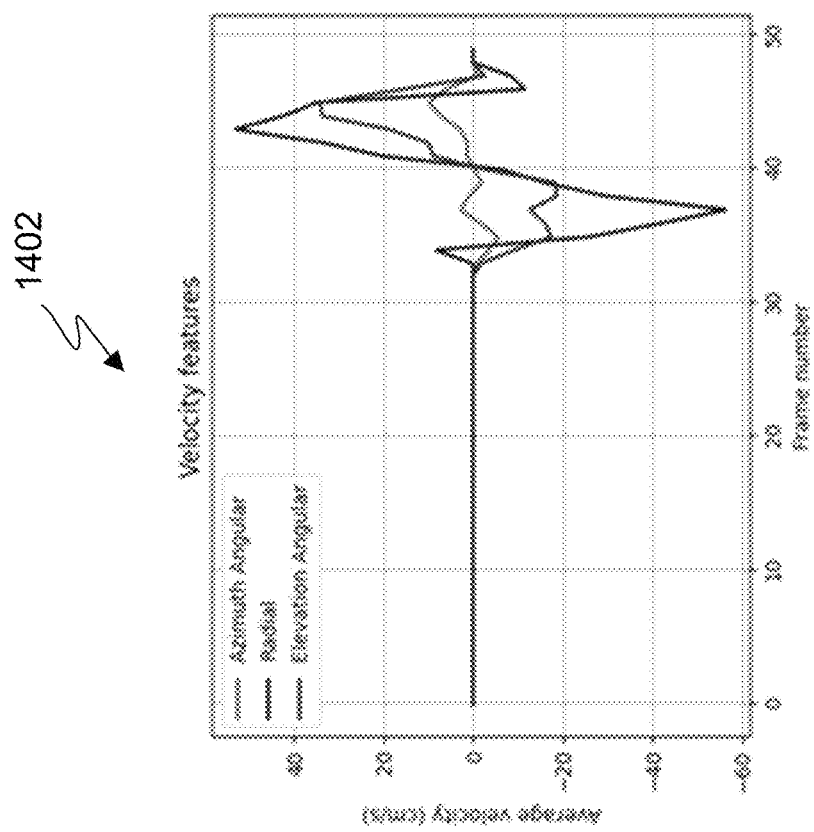

FIG. 14 illustrates examples 1402 and 1404 of extracted velocity features according to embodiments of the present disclosure. The embodiments of extracted velocity features of FIG. 14 are for illustration only. Different embodiments of extracted velocity features could be used without departing from the scope of this disclosure.

In the example of FIG. 14, extracted velocity features for Swipe center-up-center (CUC) 1402 and swipe center-down-center (CDC) 1404 gestures. In the example of FIG.

14. It can be observed that the variations in average elevation velocities are greater compared to average azimuth velocities.

Although FIG. 14 illustrates examples 1402 and 1404 of extracted velocity features, various changes may be made to FIG. 14. For example, various changes to the velocity, the angle, etc. could be made according to particular needs.

Activity Detection Module: An alternate embodiment of a gesture recognition system with burst-based ADM is presented in FIG. 23 discussed later herein. For the discussion in the current section, it is assumed any generic ADM that uses the extracted features to determine the end of an activity. For example, in a rule-based ADM, the power on each frame is compared to the noise floor to mark if the frame contains an activity or just a noise frame. Once the ADM encounters noise frames after encountering many active frames, it may declare the end of an activity. Alternatively, the ADM may be a machine learning module that is trained using appropriate data to declare the end of an activity.

Burst Attribute Determination: (Block 1010 in FIG. 10)

Once the ADM has declared the end of an activity, the number of bursts and their attributes for each velocity feature is computed (for example, based on the process flow in FIG. 10). For a particular dimension, a burst has occurred if the speed stays higher than a threshold ($|v_{th}|$) for at least two frames. Further, a burst has ended once the average velocity feature changes the sign, i.e., crosses the zero-velocity line.

Figure 15:
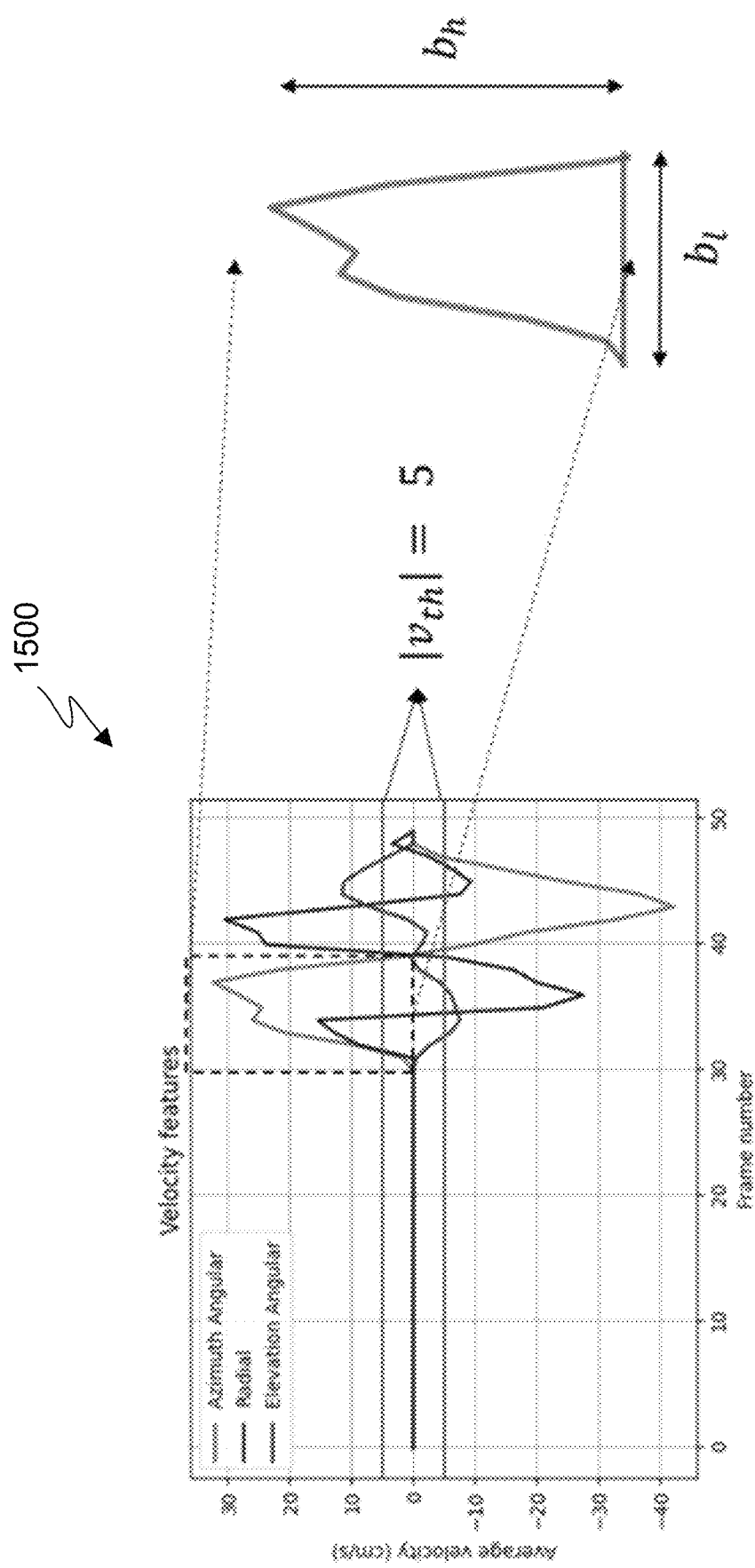
FIG. 15 illustrates an example defining a burst according to embodiments of the present disclosure.

FIG. 15 illustrates an example 1500 defining a burst according to embodiments of the present disclosure. The embodiment of a burst of FIG. 15 is for illustration only. Different embodiments of a burst be used without departing from the scope of this disclosure.

In the example of FIG. 15, an illustrative example on the burst definition used in the present disclosure is illustrated. Assuming a common threshold of 5 cm/s for each dimension, it can be observed that the radial velocity feature consists of four consecutive bursts, the azimuth tangential velocity feature has two consecutive bursts, and the elevation tangential velocity also has two consecutive bursts. It may be possible and desirable to have different thresholds $|v_{th}|$ for each orthogonal feature. Each identified burst is associated with a six-dimensional attribute tuple that includes (i) burst sign, (ii) burst area, (iii) burst length, (iv) burst height, (v) whether part of a burst chain, and (vi) whether a major or minor burst. In the example of FIG. 15, based on the absolute velocity threshold of 5 cm/s, the radial velocity has four bursts, the azimuth tangential velocity has two bursts, and the elevation tangential velocity has two bursts. The first burst corresponding to the azimuth tangential velocity has (i) positive burst sign, (ii) burst area of $b_a$=151 frame-cm/s, (iii) burst length of $b_l$≈9 frames, (iv) maximum burst height $b_h$≈31 cm/s. (v) is a part of the burst chain, and (vi) based on the area thresholds for azimuth angle it is a major burst.

Although FIG. 15 illustrates an example 1500 defining a burst, various changes may be made to FIG. 15. For example, various changes to the velocity, the angle, etc. could be made according to particular needs.

Burst attribute tuple determination: The first attribute in the tuple is the burst sign which captures whether the object (finger and fist of the user) has moved towards or away from the radar. This is straightforward to determine based on the observation of whether the burst is above or below the zero-velocity line for a particular velocity dimension. The second element of the tuple, namely, the burst area captures the total distance traveled by the target. It is determined through a simple Riemann sum.

The third and fourth elements, i.e., length and the height, respectively, of the burst are straight forward to obtain.

Figure 16:
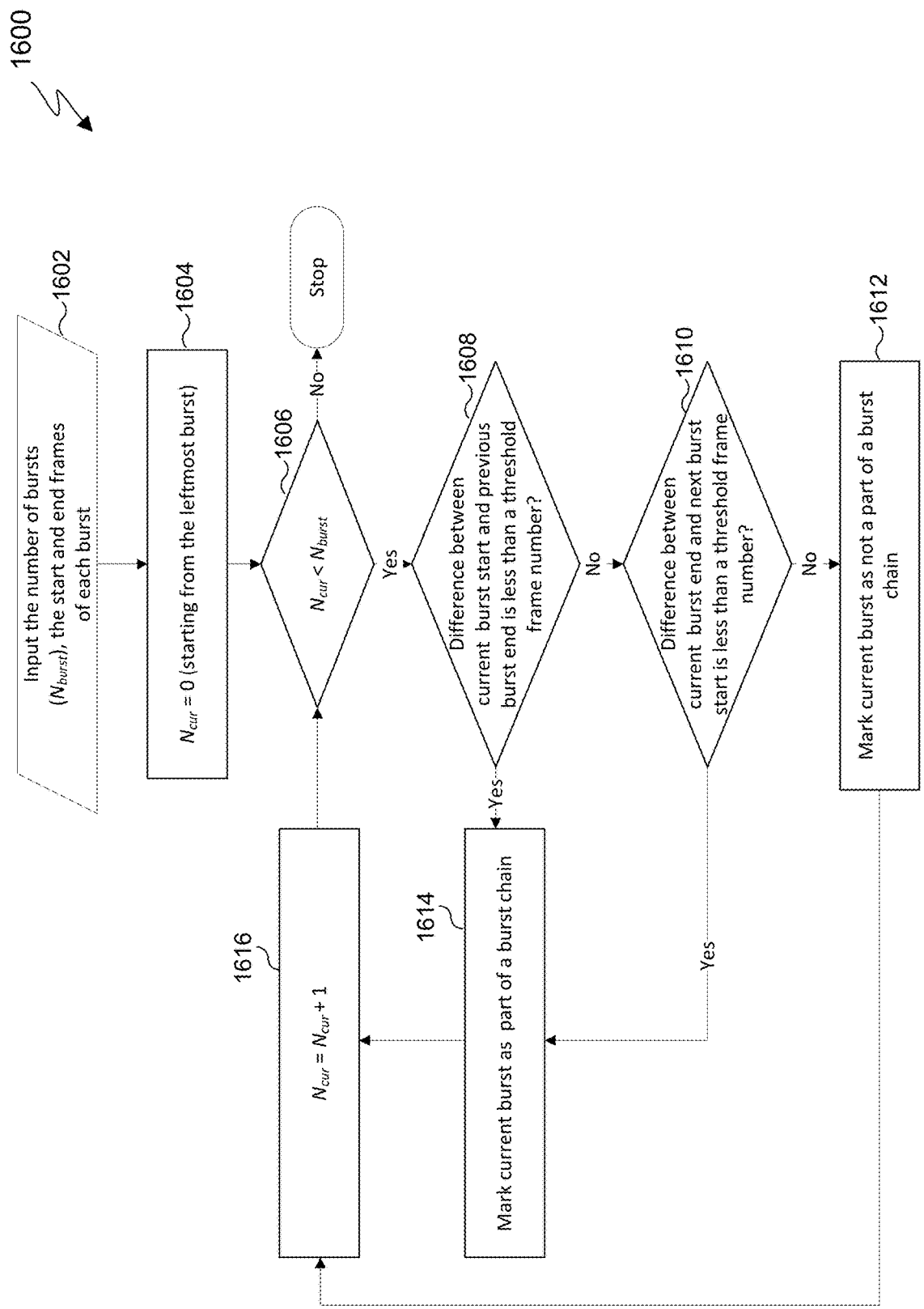
FIG. 16 illustrates a process to determine if a burst is a part of a burst chain according to embodiments of the present disclosure.

To determine whether a burst is a part of the burst chain, the process described in FIG. 16 may be followed.

FIG. 16 illustrates a process 1600 to determine if a burst is a part of a burst chain according to embodiments of the present disclosure. An embodiment of the method illustrated in FIG. 16 is for illustration only. One or more of the components illustrated in FIG. 16 may be implemented in specialized circuitry configured to perform the noted functions or one or more of the components may be implemented by one or more processors executing instructions to perform the noted functions. Other embodiments of a process 1600 to determine if a burst is a part of a burst chain could be used without departing from the scope of this disclosure.

As illustrated in FIG. 16, the process 1600 begins at step 1602. At step 1602. The number of bursts ($N_{burst}$) and the start and end frames of each burst are input. At step 1604, process starts with the leftmost burst, and determines if the current burst ($N_{cur}$) is less than the number of bursts at step 1606. If the current burst is less than the number of bursts, the process proceeds to step 1608. Otherwise the process ends. At step 1608, a determination is made whether the difference between the current burst start and previous burst end is less than a threshold frame number. If the determination is positive, the process marks the current burst as part of a burst chain at step 1614. If the determination is negative, the process proceeds to step 1610. At step 1610, a determination is made whether the difference between the current burst end and next burst start is less than a threshold frame number. If the determination is positive, the process marks the current burst as part of a burst chain at step 1614. If the determination is negative, the process proceeds to step 1612. At step 1612, the current curst is marked as not a part of a burst chain, and the process proceeds to step 1616. Finally, at step 1616 the current burst counter is incremented, and the process returns to step 1606.

Although FIG. 16 illustrates one example of a process 1600 to determine if a burst is a part of a burst chain, various changes may be made to FIG. 16. For example, while shown as a series of steps, various steps in FIG. 16 could overlap, occur in parallel, occur in a different order, or occur any number of times.

The goal of classifying a burst to be a major or minor burst is to succinctly combine the length, height, and area of the burst in a single metric. In the example of FIG. 16 after the ADM end declaration, the total number of bursts in the burst chain generated by the activity is determined. For each burst, the burst is marked as a part of the burst chain if the first frame of the burst is within a specified distance of the last frame of the previous burst or the last frame of the burst is within a specified frame apart from the first frame of the next burst. In the event that the end frame number of a previous burst or the start frame number of the next burst is absent, the corresponding decision block takes the "No" path. Based on these rules, if the number of bursts is one, then it is an isolated burst and it will be marked as not a part of the burst chain. Further, for the first burst of the chain, the first condition is not satisfied as there is no previous burst to it. However, the second condition is satisfied. Hence, it will be appropriately marked as a part of the burst chain. Similarly, for the last burst, if the first condition is satisfied, then it is marked as the part of the burst chain.

For example, in FIG. 15, the first burst corresponding to the azimuth angular velocity has (i) positive burst sign, (ii)

burst area ($b_a$) of 151 frame-cm/s, (iii) burst length ($b_l$) of 9 frames, (iv) burst height $b_h$ as 31 cm/s, and (v) is a part of the burst chain. Using information regarding the burst area, length, and height, e the burst may be categorized into a major or minor burst based on the following rule $$b_{type} = \begin{cases} \text{Major if } b_a > a_{th}^u, \ b_l > l_{th}, \text{ and } b_h > h_{th}, \\ \text{Minor if } a_{th}^l < b_a \leq a_{th}^u, \ b_l \leq l_{th}, \text{ and } b_h \leq h_{th}, \\ \text{Discard or Merge if } b_a \leq a_{th}^l, \ b_l \leq l_{th}, \text{ and } b_h \leq h_{th} \end{cases}$$

where $a_{th}^u$, $a_{th}^l$, $l_{th}$, and $h_{th}$ depends on the gesture vocabulary and may be obtained from the real world data.

The subsequent example and evaluations only consider the burst area to determine if a burst is major or minor. From the data, it can be observed that CLC, CUC, and CDC usually have two relatively larger bursts (as illustrated in FIGS. 12 and 14). In contrast, swipe-CRC usually have four relatively smaller bursts (as illustrated in FIG. 13). Hence, a goal of the present disclosure is to select $a_{th}^u$, $a_{th}^l$ in such a way that CLC, CUC, and CDC should have two major bursts in most of the cases while CRC should have four minor bursts.

Figure 17:
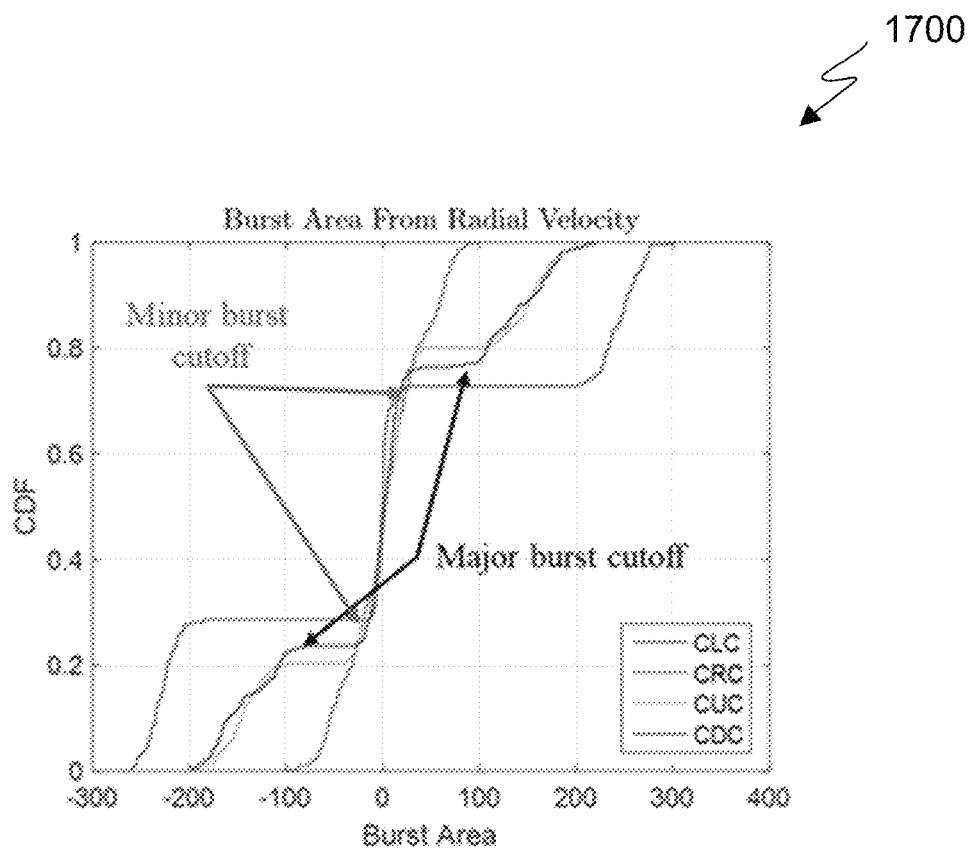
FIG. 17 illustrates an example of a cumulative distribution function of the burst area for four different swipe gestures according to embodiments of the present disclosure.

FIG. 17 illustrates an example 1700 of a cumulative distribution function of the burst area for four different swipe gestures according to embodiments of the present disclosure. The embodiment of a cumulative distribution function of FIG. 13 is for illustration only. Different embodiments of a cumulative distribution function could be used without departing from the scope of this disclosure.

In the example of FIG. 17, The cumulative distribution function (CDF) of the burst area for four different swipe gestures is illustrated. Swipe CLC, CUC, and CRC mainly includes two major bursts. In contrast, Swipe-CRC mainly has four minor bursts. The CDF curves are used in obtaining the area thresholds to determine the burst types. The area threshold can be further tuned to minimize the false alarm and missed detections.

Although FIG. 17 illustrates an example 1700 of a cumulative distribution function of the burst area for four different swipe gestures, various changes may be made to FIG. 13. For example, various changes to the burst area, the burst cutoffs, etc. could be made according to particular needs.

Observing the CDF of the burst area presented in FIG. 17, first a rough estimate is obtained of the area thresholds for the radial velocity that may be used to classify a burst as follows $$b_{type}^{rad} = \begin{cases} \text{Major if } b_a^{rad} > 80 \\ \text{Minor if } 20 \leq b_a^{rad} \leq 80. \end{cases}$$

These thresholds may be further tuned so as to reduce the probability of false negatives (missed detection) in gesture data and reduce the probability of false positives (false alarms) in non-gesture data in valid activity identification process discussed next.

Using the similar process, the thresholds may also be obtained for major and minor burst classification for azimuth angular velocity and elevation angular velocity as presented below.

$$b_{type}^{el} = \begin{cases} \text{Major if } b_a^{el} > 50 \\ \text{Minor if } 10 \leq b_a^{el} \leq 50, \end{cases}$$

-continued $$b_{type}^{az} = \begin{cases} \text{Major if } b_a^{az} > 50 \\ \text{Minor if } 10 \leq b_a^{el} \leq 50. \end{cases}$$

Major and minor burst statistics in a valid gesture/activity: Based on the above area thresholds, for four different swipe gestures the bursts are characterized into either major or minor bursts for two unseen users. For this example, the burst statistics results for the radial velocity feature is presented. Table 1 presents the joint probability mass function (PMF) of the number of major and minor bursts for each type of gesture. The empirical PMF is obtained using 800 samples. Based on the joint PMF of each gesture, the following guidelines may be derived on the combination of the number of major and minor bursts in an activity to conclude that it may contain a valid gesture:

1. If an activity has two major bursts (M=2), then the likelihood of it is being a gesture is high.
2. If an activity has one major burst (M=1), then presence of at least one or more minor bursts (K≥1) increases the likelihood of the activity being a gesture.
3. If an activity has no major bursts (M=0), then the presence of three or more minor bursts (K≥3) increases the likelihood of the activity being a gesture.

TABLE 1

The joint PMF of the number of major and minor bursts, where M, and K are the number of major and minor bursts, respectively, for each gesture type. The statistics are collected over 800 samples.

| CLC | | | | | |
|---|---|---|---|---|---|
| | K = 0 | K = 1 | K = 2 | K = 3 | K = 4 |
| M = 0 | 0 | 0 | 0 | 0 | 0 |
| M = 1 | 0 | 0 | 0 | 0 | 0 |
| M = 2 | 0.915 | 0.075 | 0.01 | 0 | 0 |
| M = 3 | 0 | 0 | 0 | 0 | 0 |

| CRC | | | | | |
|---|---|---|---|---|---|
| | K = 0 | K = 1 | K = 2 | K = 3 | K = 4 |
| M = 0 | 0 | 0 | 0.08 | 0.29 | 0.41 |
| M = 1 | 0 | 0.08 | 0.1 | 0.01 | 0 |
| M = 2 | 0.01 | 0.015 | 0.005 | 0 | 0 |
| M = 3 | 0 | 0 | 0 | 0 | 0 |

| CUC | | | | | |
|---|---|---|---|---|---|
| | K = 0 | K = 1 | K = 2 | K = 3 | K = 4 |
| M = 0 | 0 | 0 | 0 | 0 | 0.005 |
| M = 1 | 0 | 0.05 | 0.045 | 0.005 | 0 |
| M = 2 | 0.48 | 0.345 | 0.07 | 0 | 0 |
| M = 3 | 0 | 0 | 0 | 0 | 0 |

| CDC | | | | | |
|---|---|---|---|---|---|
| | K = 0 | K = 1 | K = 2 | K = 3 | K = 4 |
| M = 0 | 0 | 0 | 0 | 0 | 0 |
| M = 1 | 0 | 0.025 | 0 | 0 | 0 |
| M = 2 | 0.9 | 0.075 | 0 | 0 | 0 |
| M = 3 | 0 | 0 | 0 | 0 | 0 |

Post-ADM Non-Gesture Rejection: (Block 1012 in FIG. 10)

Figure 18:
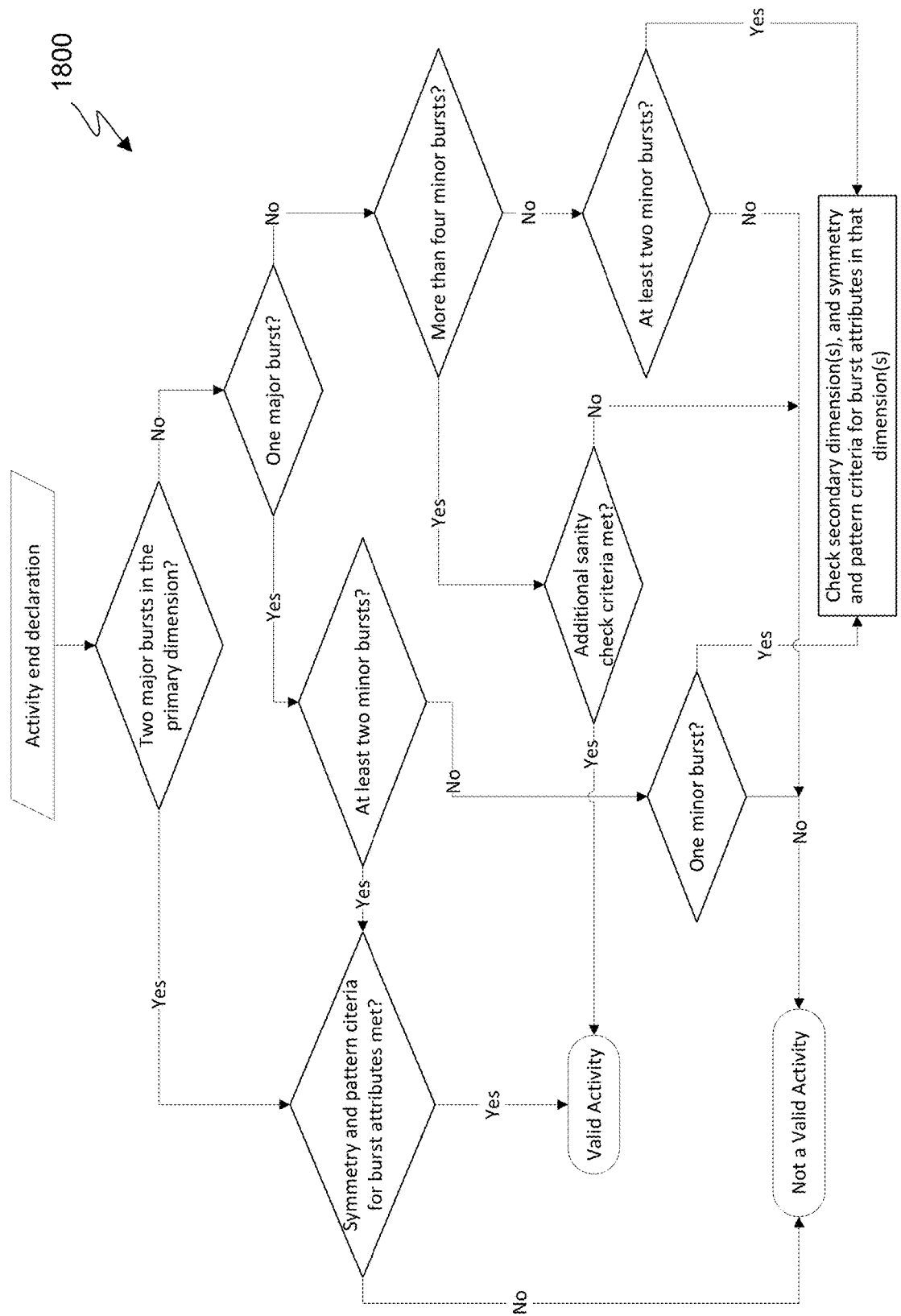
FIG. 18 illustrates a process to determine whether a valid activity has been detected by an ADM according to embodiments of the present disclosure.

Once the ADM declares the end of an activity, first it is checked if the activity is a valid one or not before passing the frames to the gesture classifier. The goal is to reject any non-gesture that do not meet the criteria of the gesture set. This helps in reducing the system complexity by avoiding unnecessary triggers of the gesture classifier. In FIG. 18, the criteria to determine whether a valid activity has been detected by the ADM based on the number and types of bursts in the gesture is presented.

FIG. 18 illustrates a process 1800 to determine whether a valid activity has been detected by the ADM according to embodiments of the present disclosure. An embodiment of the method illustrated in FIG. 18 is for illustration only. One or more of the components illustrated in FIG. 18 may be implemented in specialized circuitry configured to perform the noted functions or one or more of the components may be implemented by one or more processors executing instructions to perform the noted functions. Other embodiments to determine whether a valid activity has been detected by the ADM could be used without departing from the scope of this disclosure.

In the example of FIG. 18, the inferences derived in the last sub-section is used to perform the first set of checks. In the next step, relationship among different burst attributes may be used to further improve the decision making process. Note that these relationships depend on the types of the gesture that are in the vocabulary. Hence, as the gesture vocabulary changes, a slight modification in the rules may be necessary while the underlying principles remain the same. The goal is to exploit the following key characteristics of the gestures in the vocabulary:

As observed in Table 1, in majority of the cases, there may be either two consecutive major bursts or four consecutive minor bursts. Further, depending on the gesture type, the burst signs may follow a predefined pattern.

In the ideal case, the velocity features corresponding to the gestures are symmetric across all three spatial dimensions. Hence, the area corresponding to the positive bursts should be almost equal to the area corresponding to the negative bursts. However, in practical scenarios, due to asymmetry in gestures performed by the user and noise in the data, the positive burst area may not be equal to the negative burst area. However, these two areas should not be far off from each other.

Consider the fact that the measurement across one spatial dimension may be more reliable compared to other dimensions. For example, if the gesture set has higher radial movement compared to angular movement, the radial velocity feature may contain more reliable information compared to tangential velocity features. Further, in some cases, due to the hardware limitation, the movement in one spatial dimension may be captured more accurately compared to other dimensions. Hence, it may be desirable to consider a particular feature as the primary feature while other features as the secondary features. If analyzing the primary feature dimension provides us with conclusive evidence that a valid activity may have happened, then the analysis of secondary features may be avoided. In contrast, if the evidence of a valid activity is inconclusive from the primary feature analysis, the secondary features may be further analyzed for accepting or rejecting the activity.

With the above background, in FIG. 18, the overall process flow is presented to identify if an activity is valid or not based on the burst characteristics of the velocity features for different gestures. The radial velocity is selected as the primary feature for this example.

Figure 19:
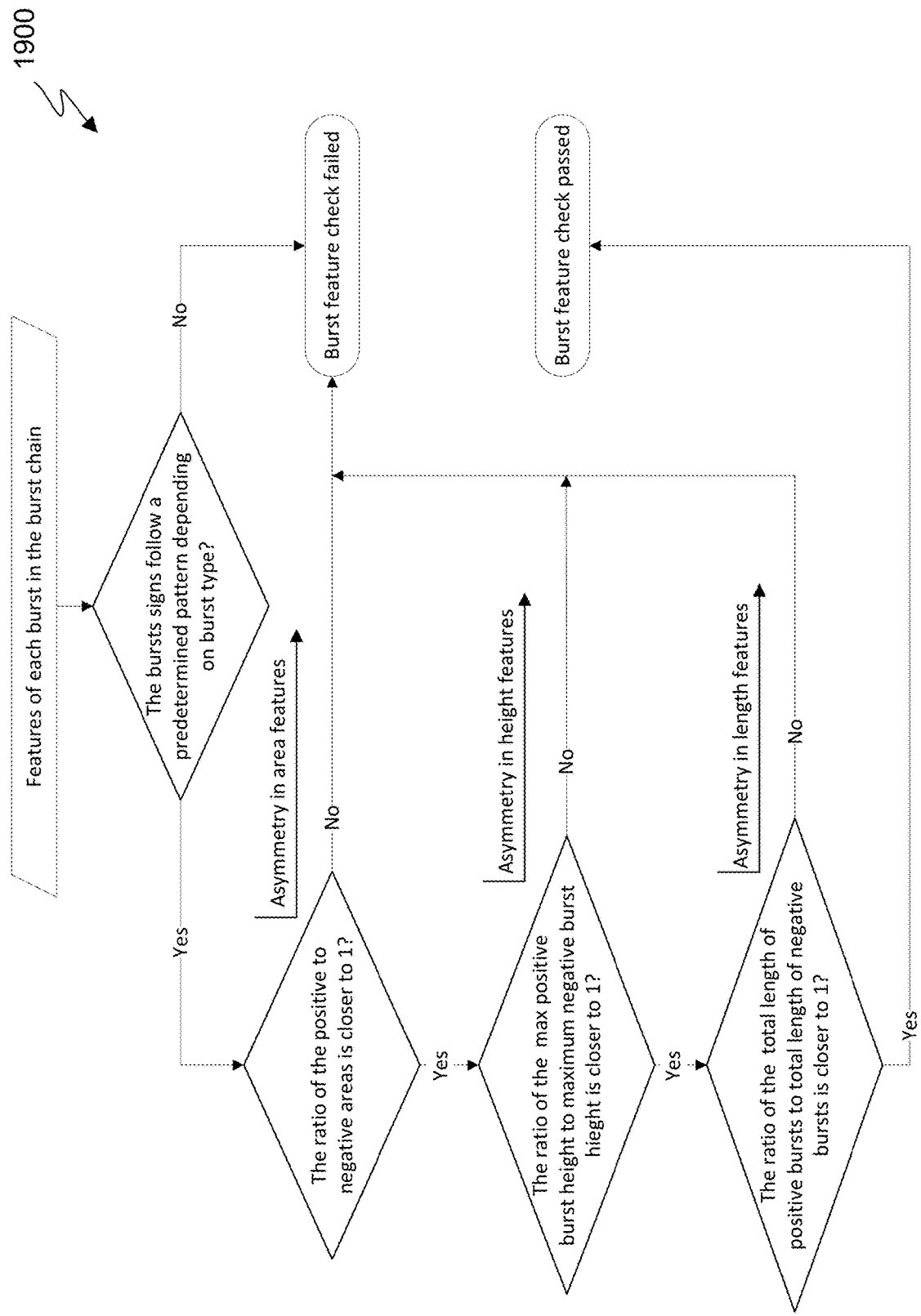
FIG. 19 illustrates an example of a burst feature check criteria that uses the burst sign pattern and the symmetry of positive and negative bursts according to embodiments of the present disclosure.

For the gestures in the vocabulary, it is known that if there are two major bursts, then the activity may contain a valid gesture. Hence, after detecting the two consecutive major bursts, additional check is performed that aims to exploit a few specific relationships related to burst pattern and symmetry in burst attributes. FIG. 19 presents the additional criteria that consider the burst pattern in a burst chain and the symmetry in the positive and negative bursts.

FIG. 19 illustrates an example 1900 of a burst feature check criteria that uses the burst sign pattern and the symmetry of positive and negative bursts according to embodiments of the present disclosure. An embodiment of the method illustrated in FIG. 19 is for illustration only. One or more of the components illustrated in FIG. 19 may be implemented in specialized circuitry configured to perform the noted functions or one or more of the components may be implemented by one or more processors executing instructions to perform the noted functions. Other embodiments of a burst feature check criteria could be used without departing from the scope of this disclosure.

In the example of FIG. 19, one or more of the illustrated conditions may be checked after the burst number criteria has been satisfied as outlined in FIG. 18.

Although FIG. 19 illustrates one example 1900 of a burst feature check, various changes may be made to FIG. 19. For example, while shown as a series of steps, various steps in FIG. 19 could overlap, occur in parallel, occur in a different order, or occur any number of times.

In the actual implementation, any combination of these criteria may be used. First, it may be checked if the burst chain follows a predefined pattern. This pattern depends on the type of the gesture in our vocabulary. For example, for the swipe gestures, it is expected for the first major burst in the radial direction to have a negative sign and the next major burst to have a positive sign. Alternatively, if the first burst is not a major burst, then it may have a positive sign. It can be observed this for CRC, where the first burst is not a major burst. Once the burst sign condition is met, other burst features may be checked to infer whether a valid activity has ended. For example, burst area, burst length, and burst height may be used to infer if the bursts of opposite signs are symmetric. The ratio of the positive burst attributes to the negative burst attribute is taken and compared with a threshold. In the ideal case, this ratio should be equal to one. However, in practical scenario, this ratio may deviate from one. Hence, the upper and lower thresholds need to be adjusted as per observation from the data.

In the example of FIG. 18, if there are less than two major bursts, it is checked if only one major and at least two minor bursts are present. If the condition is satisfied, then perform the additional burst-attribute based criteria may be performed to determine if the activity is valid. In the absence of a major burst, a higher number of minor bursts is needed in the feature to infer that a potential valid activity may be present. For further conclusion, the additional burst-based attribute criteria in FIG. 19 can be checked for the primary dimension features.

If the total number of minor bursts are less than a threshold, e.g., 3, it may be necessary to analyze the features in the secondary dimensions to confidently declare that a valid activity might be present. A similar framework as used for primary dimension can be used for secondary dimensions as well. Once all criteria are met in the secondary dimension(s), it may be inferred that a valid activity has been detected. Depending on the target rates of false positives and false negatives, various thresholds for burst-based criteria may be modified.

Although FIG. 18 illustrates one example of a process 1800 to determine whether a valid activity has been detected by the ADM, various changes may be made to FIG. 18. For example, while shown as a series of steps, various steps in FIG. 18 could overlap, occur in parallel, occur in a different order, or occur any number of times.

Figure 24:
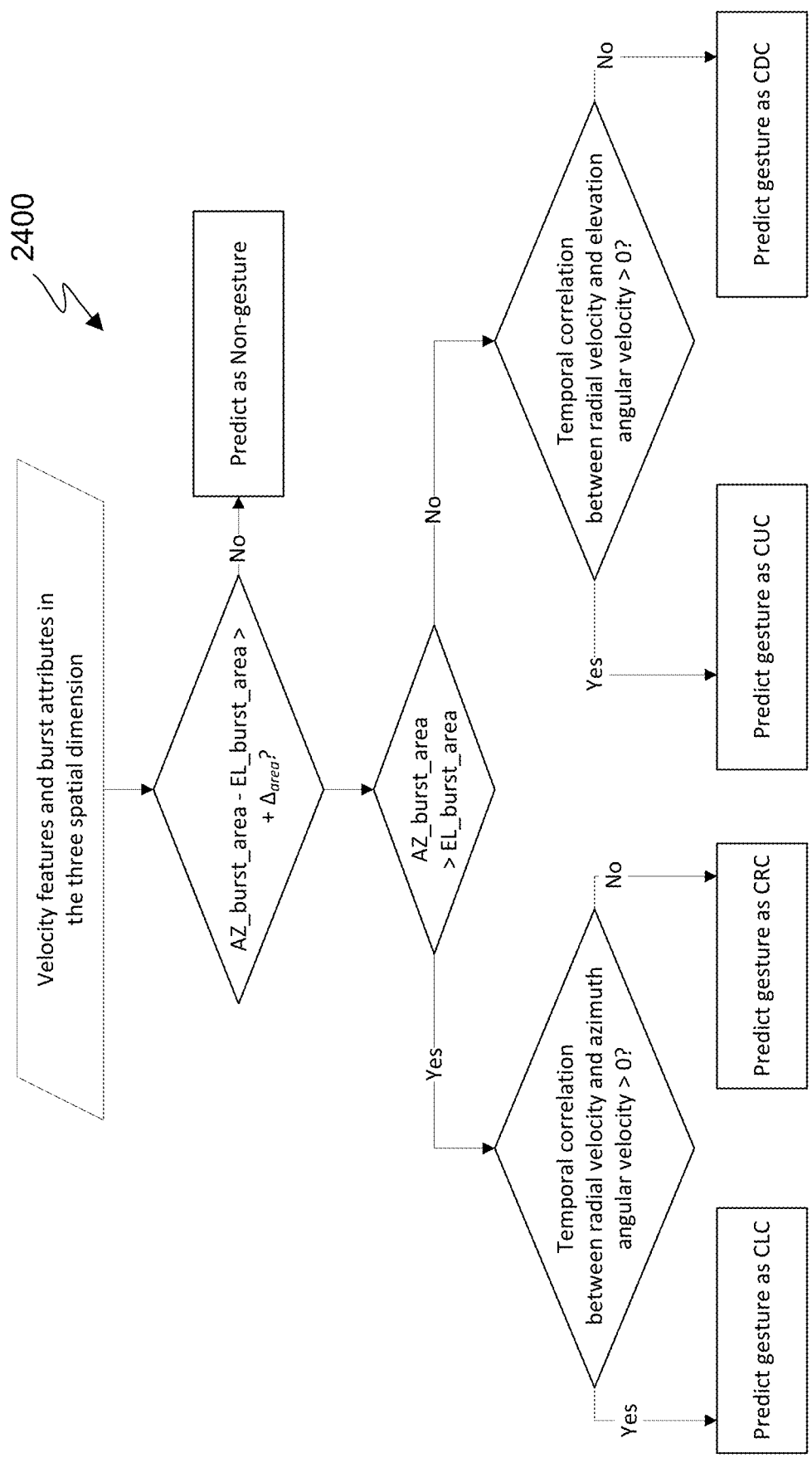
FIG. 24 illustrates a process to classify swipe gestures according to embodiments of the present disclosure.

Gesture Classifier:

Once a valid activity has been detected by the ADM and it is not rejected by the post-ADM non-gesture rejection module, the gesture classifier (GC) is triggered. The gesture classifier may take the extracted feature as input to classify the valid activity as the appropriate gesture. The gesture classifier may be a machine learning-based module trained on a large amount of gesture data. In contrast, FIG. 24 presents an alternate embodiment where a burst-based gesture classifier may be used to classify the gestures.

Post-GC Non-Gesture Rejection: (Block 1016 in FIG. 10)

Two Post-GC non-gesture rejection methods are presented to reject any non-gesture that may incorrectly get classified as a gesture. The gesture classifier, which may be an ML module, predicts the performed gesture. There is a possibility that once the classifier encounters a non-gesture, which may be an out-of-distribution non-gesture sample, it may predict it as one of the gestures in the vocabulary. The goal of the Post-GC non-gesture rejection is to reduce the amount of false alarm (false positives) in such cases.

Figure 20:
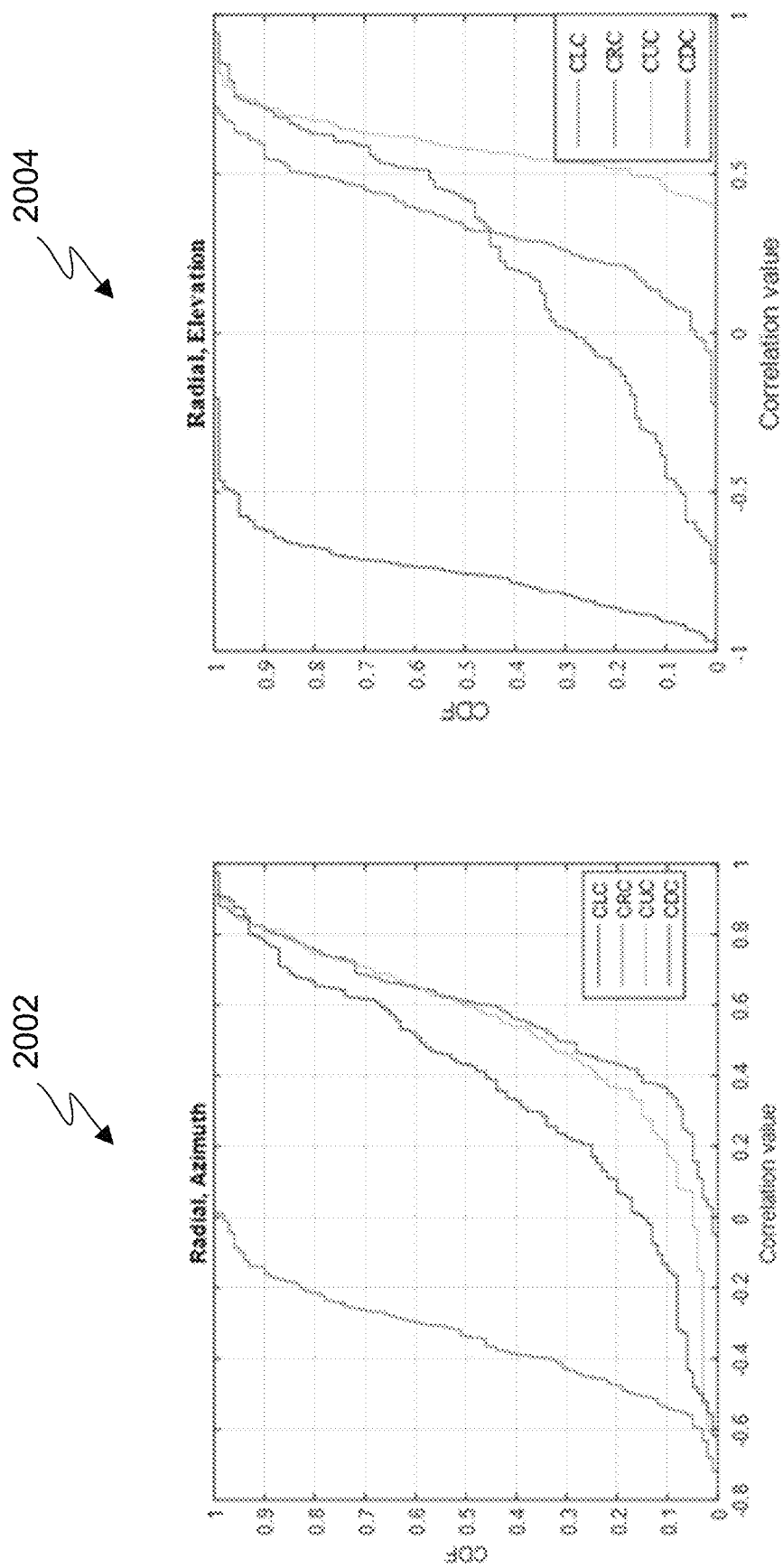
FIG. 20 illustrates examples of feature correlation according to embodiments of the present disclosure.

After the gesture prediction, a set of rules may be used to determine if the predicted gesture satisfies certain criteria. These criteria are gesture specific and need to be determined separately for each gesture. If the predicted gesture does not meet one or more of the criteria, then the activity may be declared as non-gesture. One of such criteria is the temporal correlation among different velocity features. The motivation behind consideration of the temporal correlation stems from the fact that for CLC, the temporal variations in the azimuth (tangential) velocity and the radial velocity are positively correlated. In contrast, for CRC, this correlation for azimuth velocity and radial velocity is negative. Similar logic is true to for CUC and CDC where radial and azimuth velocities over time have positive and negative correlations, respectively. In FIG. 20, the feature correlation to support the above hypothesis is plotted.

FIG. 20 illustrates examples 2002 and 2004 of feature correlation according to embodiments of the present disclosure. The embodiment of feature correlation of FIG. 20 is for illustration only. Different embodiments of feature correlation could be used without departing from the scope of this disclosure.

In the example of FIG. 20, temporal correlation between radial velocity and azimuth tangential velocity (2002) and temporal correlation between radial velocity and elevation tangential velocity (2004) is illustrated.

In one example, the above correlation thresholds may be used to reject a non-gesture. Consider the case, where a non-gesture has been classified as CDC. However, after radial and elevation velocity feature correlation, it can be observed that the feature is negative. In such case, the activity may be rejected as a non-gesture.

Although FIG. 20 illustrates an example of feature correlation, various changes may be made to FIG. 20. For example, various changes to the gestures, the correlation value, etc. could be made according to particular needs.

Figure 21:
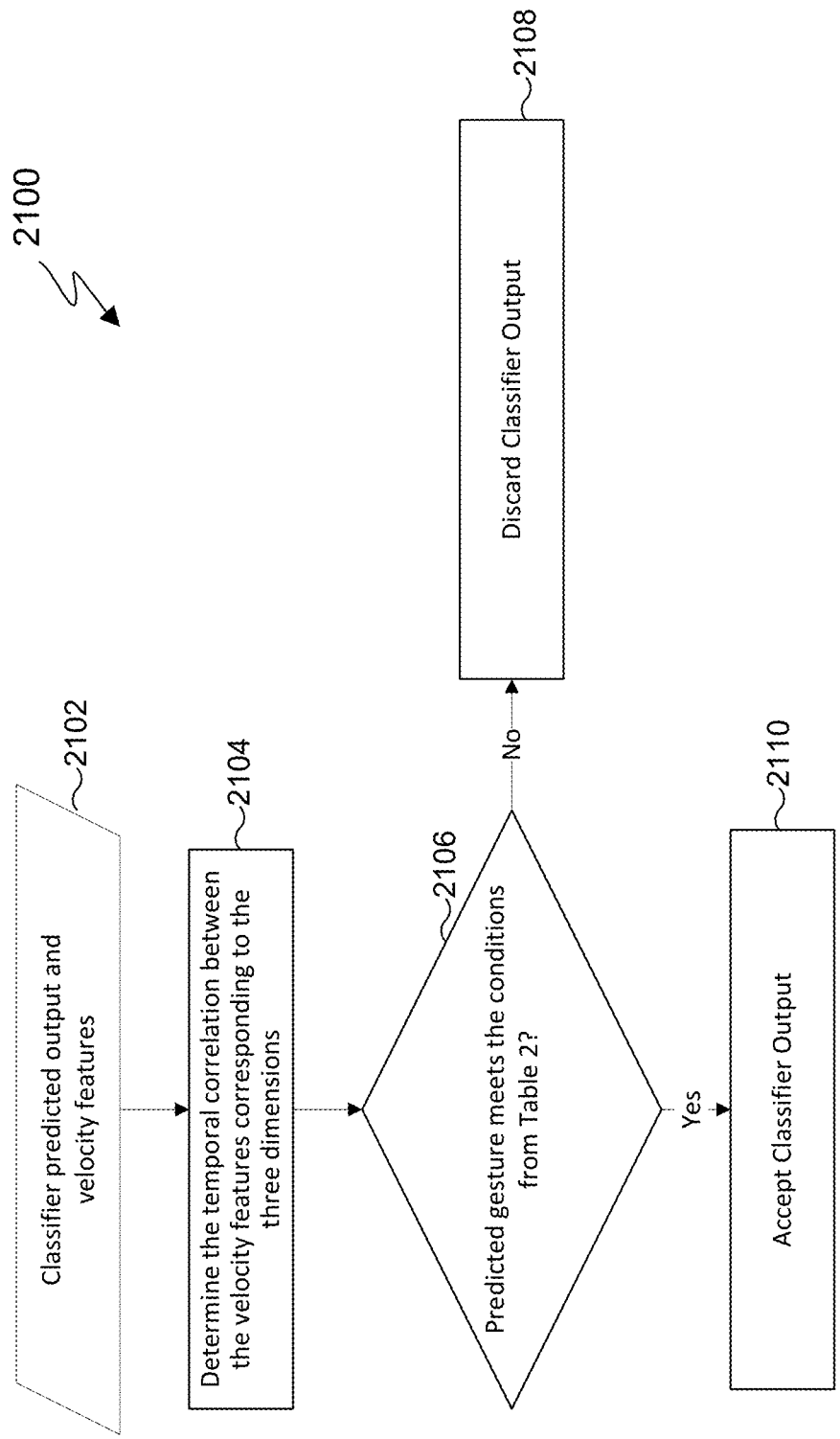
FIG. 21 illustrates a process to determine whether a predicted gesture is valid or not based on velocity feature correlation criteria according to embodiments of the present disclosure.

FIG. 21 illustrates a process 2100 to determine whether a predicted gesture is valid or not based on velocity feature correlation criteria according to embodiments of the present disclosure. An embodiment of the method illustrated in FIG. 21 is for illustration only. One or more of the components illustrated in FIG. 21 may be implemented in specialized circuitry configured to perform the noted functions or one or more of the components may be implemented by one or more processors executing instructions to perform the noted functions. Other embodiments to determine whether a predicted gesture is valid or not based on velocity feature correlation criteria could be used without departing from the scope of this disclosure.

In the example of FIG. 21, criteria to determine whether a predicted gesture is valid or not based on velocity feature correlation criteria presented in Table 2 is illustrated.

TABLE 2

Signatures for burst area and velocity feature correlation for different types of Swipe gestures. X denotes the "Irrelevant" condition.

| Gesture Type | Az_burst_area > El_burst_area + δ | El_burst_area > Az_burst_area + δ | Rad_az_corr > 0? | Rad_el_corr > 0? |
|---|---|---|---|---|
| Swipe-CLC | 1 | 0 | 1 | X |
| Swipe-CRC | 1 | 0 | 0 | X |
| Swipe-CUC | 0 | 1 | X | 1 |
| Swipe-CDC | 0 | 1 | X | 0 |

As illustrated in FIG. 21, the process 2100 begins at step 2102. At step 2102, Classifier predicted output and velocity features are input. At step 2104, the temporal correlation between the velocity features corresponding to the three dimensions is determined. At step 2106, it is determined whether the gesture meets the conditions from Table 2. If the determination is negative, the classifier output is discarded at step 2108. If the determination is positive, the classifier output is accepted at step 2110.

Although FIG. 21 illustrates one example of a process 2100 to determine whether a predicted gesture is valid or not based on velocity feature correlation criteria, various changes may be made to FIG. 21. For example, while shown as a series of steps, various steps in FIG. 21 could overlap, occur in parallel, occur in a different order, or occur any number of times.

Figure 22:
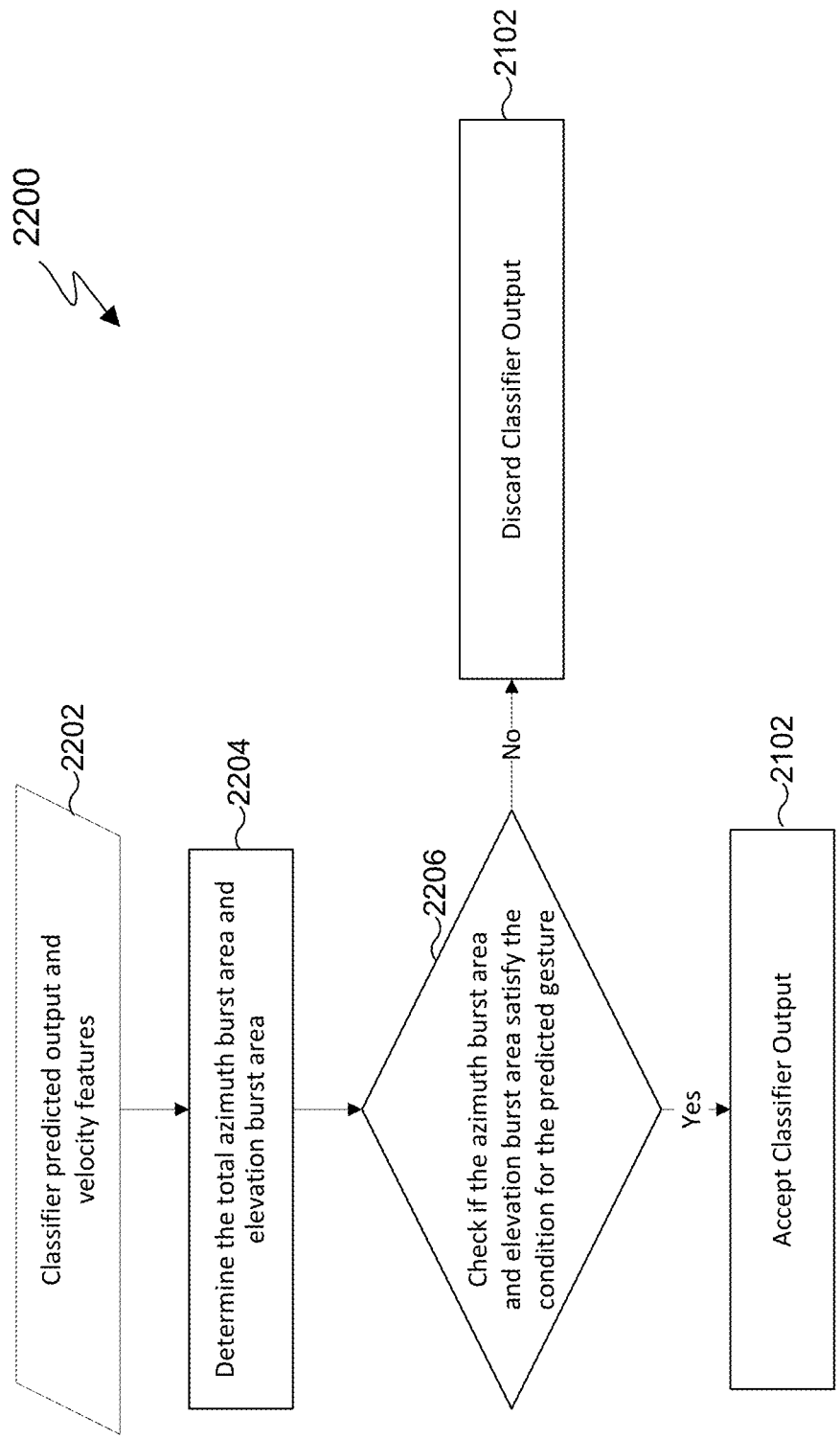
FIG. 22 illustrates a process to determine whether a predicted gesture is valid or not based on azimuth and elevation burst area comparison according to embodiments of the present disclosure.

Another embodiment, to reject non-gesture can be based on the total radial burst area and elevation burst area. For example, in case of CLC and CRC, the movement in azimuth axis is significantly more compared to the movement in the elevation axis. Hence, the azimuth burst area is expected to be more compared to the elevation burst area. On the other hand, in case of CUC and CDC, the elevation burst area will be compared to azimuth area. These observations may be used with appropriate thresholds to reject the non-gesture activity once the gesture is predicted by the classifier. FIG. 22, presents this method to reject non-gesture based on azimuth and elevation burst-area comparison. Burst height along with burst area may also be used to have a more reliable method.

FIG. 22 illustrates a process 2200 to determine whether a predicted gesture is valid or not based on azimuth and elevation burst area comparison according to embodiments of the present disclosure. An embodiment of the method illustrated in FIG. 22 is for illustration only. One or more of the components illustrated in FIG. 222 may be implemented in specialized circuitry configured to perform the noted functions or one or more of the components may be implemented by one or more processors executing instructions to perform the noted functions. Other embodiments to determine whether a predicted gesture is valid or not based on azimuth and elevation burst area comparison could be used without departing from the scope of this disclosure.

As illustrated in FIG. 22, the process 2200 begins at step 2202. At step 2202, Classifier predicted output and velocity features are input. At step 2204, the total azimuth burst area and elevation burst area is determined. At step 2206, it is determined whether the azimuth burst area and elevation burst area satisfy the condition for the predicted gesture. If the determination is negative, the classifier output is discarded at step 2208. If the determination is positive, the classifier output is accepted at step 2210.

Although FIG. 22 illustrates one example of a process 2200 to determine whether a predicted gesture is valid or not based on azimuth and elevation burst area comparison, various changes may be made to FIG. 22. For example, while shown as a series of steps, various steps in FIG. 22 could overlap, occur in parallel, occur in a different order, or occur any number of times.

Burst counter-based activity end declaration: An alternate embodiment for the gesture classification system is presented in FIG. 23 where the ADM module is replaced with the burst counter to determine the end of an activity.

Figure 23:
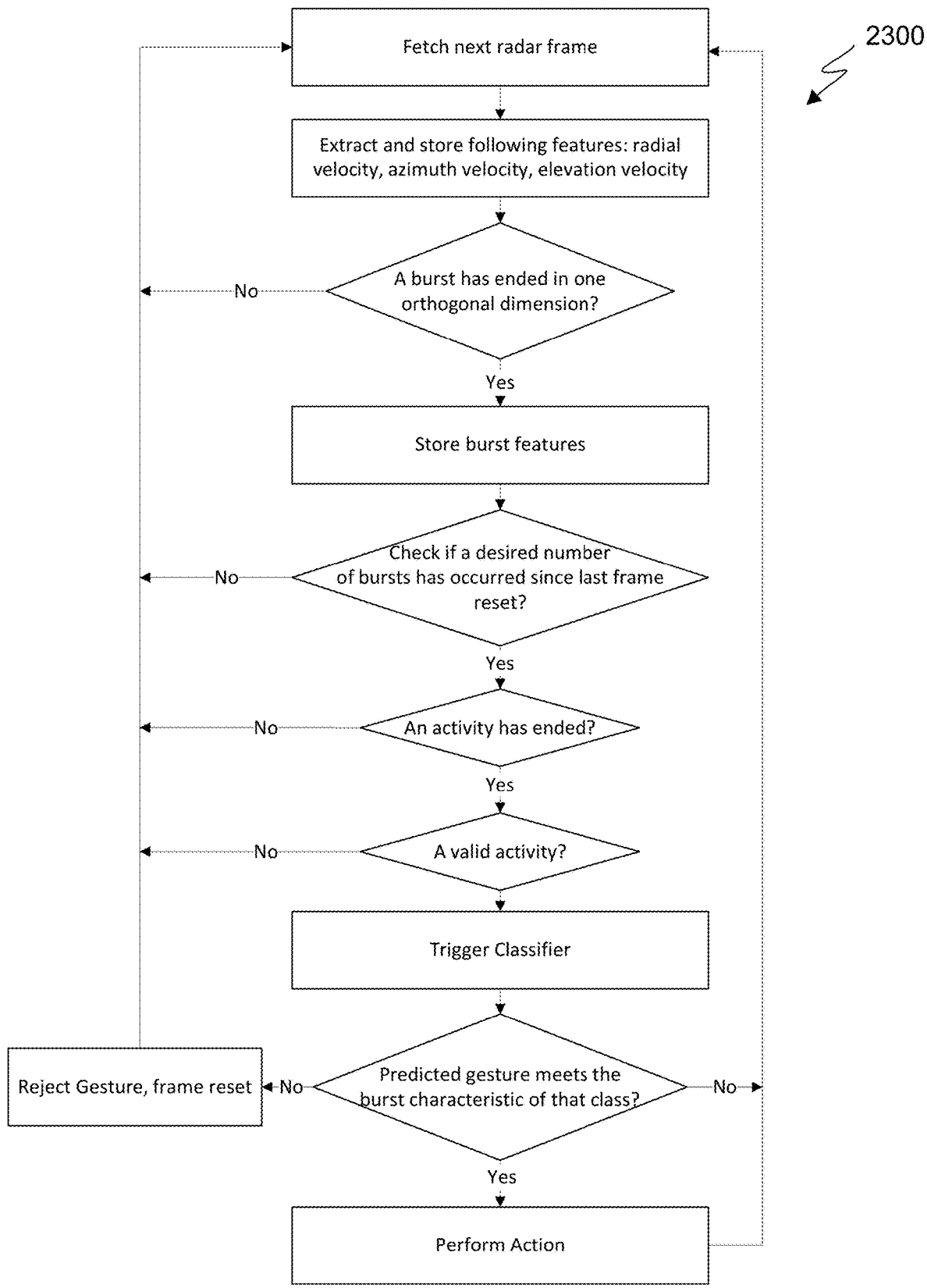
FIG. 23 illustrates a process for burst-based gesture and non-gesture identification according to embodiments of the present disclosure.

FIG. 23 illustrates a process 2300 for burst-based gesture and non-gesture identification according to embodiments of the present disclosure. An embodiment of the method illustrated in FIG. 23 is for illustration only. One or more of the components illustrated in FIG. 23 may be implemented in specialized circuitry configured to perform the noted functions or one or more of the components may be implemented by one or more processors executing instructions to perform the noted functions. Other embodiments for burst-based gesture and non-gesture identification could be used without departing from the scope of this disclosure.

In the example of FIG. 23, a solution is presented for burst-based gesture and non-gesture identification at various stages of a gesture classification system. In this process flow, a burst counter is used to declare the end of a potential valid activity. The idea is that a valid gesture should contain at least two bursts. Hence, since the last frame reset (this may correspond to the time where either a valid gesture got accepted or non-gesture got rejected after classification) if the number of bursts is at least two, it may be considered the end of a potential gesture activity and the process may proceed with subsequent decision blocks. This block may work in parallel with the traditional ML-based ADM, where as soon as a specified number of bursts has ended it may be declared the end of activity without waiting for the ADM output. The main advantage of this method is reduction in latency. The embodiments presented in the previous section of this disclosure may be modified appropriately to enable a gesture recognition system that operates using burst counter based activity end detection (as presented in FIG. 23).

Although FIG. 23 illustrates one example of a process 2300 for burst-based gesture and non-gesture identification, various changes may be made to FIG. 23. For example, while shown as a series of steps, various steps in FIG. 23 could overlap, occur in parallel, occur in a different order, or occur any number of times.

Rule-based gesture classifier using burst attributes: The conditions presented in Table 2 may be combined to devise a rule-based gesture classifier that may be preferred over a more complex ML-based classifier. The process flow for gesture classification is presented in FIG. 24.

FIG. 24 illustrates a process 2400 to classify swipe gestures according to embodiments of the present disclosure. An embodiment of the method illustrated in FIG. 24 is for illustration only. One or more of the components illustrated in FIG. 24 may be implemented in specialized circuitry configured to perform the noted functions or one or more of the components may be implemented by one or more processors executing instructions to perform the noted functions. Other embodiments to classify swipe gestures could be used without departing from the scope of this disclosure.

FIG. 24 presents a rule-based gesture classifier to classify the four types of swipe gesture considered in the present disclosure. In the example of FIG. 24, first the absolute azimuth burst area and absolute elevation burst area are compared to determine in which dimension the target movement is larger. In the typical scenario, it is expected that the azimuth burst area will be larger for CLC and CRC. In contrast, the movement in the elevation direction will be larger compared to azimuth direction for CDC and CUC. Based on the result according to FIG. 20, the temporal correlation among different velocity features is used to determine the type of gesture performed.

Although FIG. 24 illustrates one example of a process 2400 to classify swipe gestures, various changes may be made to FIG. 24. For example, while shown as a series of steps, various steps in FIG. 24 could overlap, occur in parallel, occur in a different order, or occur any number of times.

Figure 25:
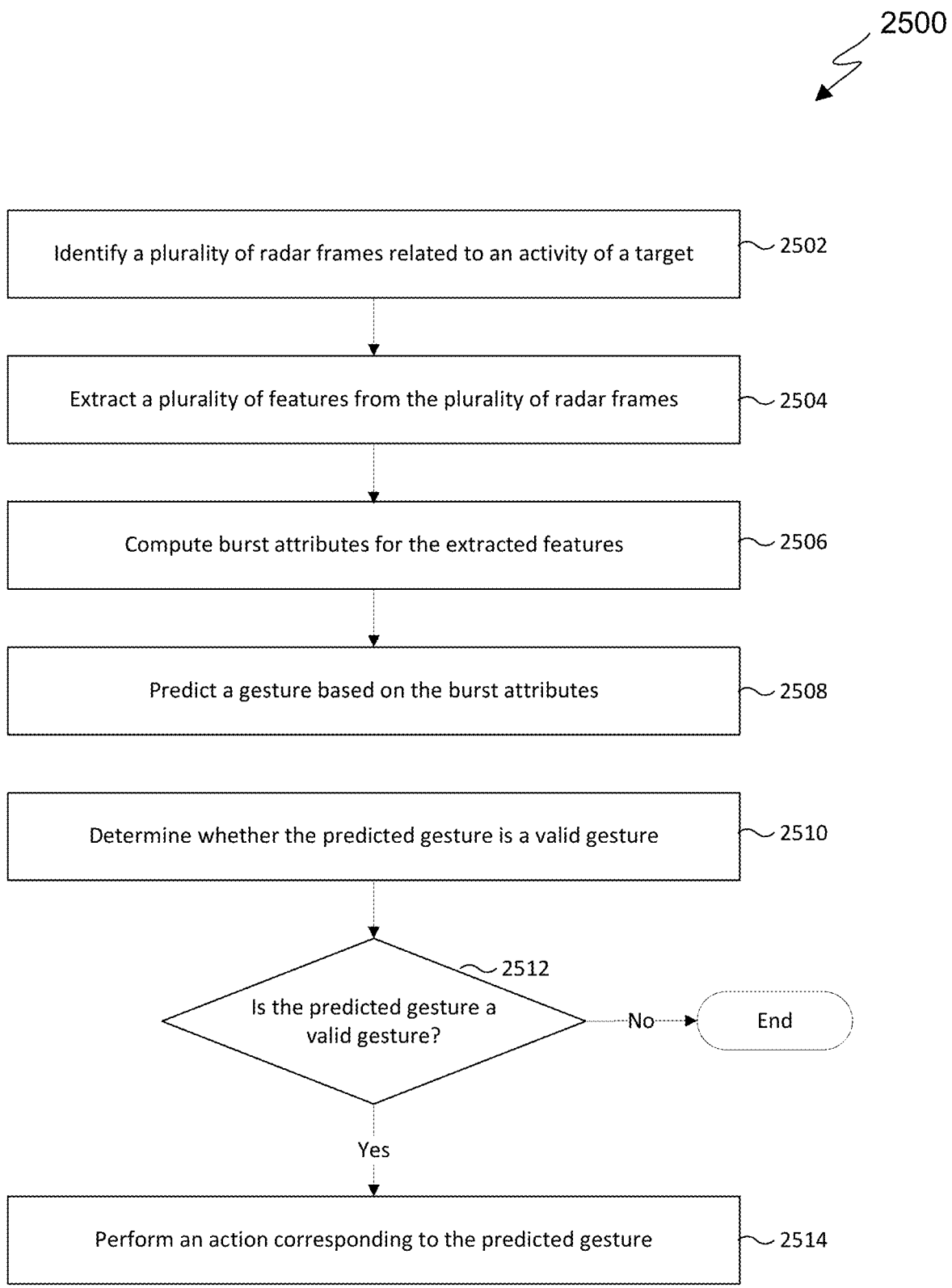
FIG. 25 illustrates a method for burst-based non-gesture rejection in a micro-gesture recognition system according to embodiments of the present disclosure.

FIG. 25 illustrates a method 2500 for burst-based non-gesture rejection in a micro-gesture recognition system according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments of burst-based non-gesture rejection could be used without departing from the scope of this disclosure.

As illustrated in FIG. 25, the method 2500 begins at step 2502. At step 2502, a plurality of radar frames related to an activity of a target is identified based on received radar signals. At step 2504, a plurality of features are extracted from the plurality of radar frames. At step 2506, burst attributes are computed for the extracted features. At step 2508 a gesture is predicted based on the burst attributes. At step 2510, a determination is made whether the predicted gesture is a valid gesture. If the gesture is determined to be invalid, the method ends. If the gesture is determined to be valid, an action is performed corresponding to the predicted gesture at step 2514.

Although FIG. 25 illustrates one example of a method 2500 for burst-based non-gesture rejection in a micro-gesture recognition system, various changes may be made to FIG. 25. For example, while shown as a series of steps, various steps in FIG. 25 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined by the claims.

What is claimed is:

1. An electronic device comprising:
a transceiver configured to transmit and receive radar signals; and
a processor operatively coupled to the transceiver, the processor configured to:
identify, based on the received radar signals, a plurality of radar frames related to an activity of a target;
extract a plurality of features from the plurality of radar frames;
compute burst attributes for the extracted features;
predict a gesture based on the burst attributes;
determine whether the predicted gesture is a valid gesture; and
if the predicted gesture is a valid gesture, perform an action corresponding to the predicted gesture.

2. The electronic device of claim 1, wherein to extract the plurality of features from the plurality of radar frames, the processor is further configured to, for each radar frame:
obtain a Range-Doppler map;
select a column corresponding to a peak of the target in a range profile;
calculate an average radial velocity of the target;
obtain an azimuth and elevation angle spectrum corresponding to a target peak;
calculate an average angle of the target; and
obtain average azimuth/elevation tangential velocities based on a target angle variation over two frames.

3. The electronic device of claim 1, wherein the processor is further configured to:
determine, based on the burst attributes, whether the activity of the target is a valid activity,
wherein the gesture is predicted based on the activity of the target being the valid activity.

4. The electronic device of claim 1, wherein to predict the gesture, the processor is further configured to:
determine whether symmetry and pattern criteria for the burst attributes are met;
based on whether the symmetry and pattern criteria for the burst attributes are met, determine whether the activity is a valid activity;
perform a gesture classification on the activity if the activity is a valid activity, wherein the gesture classification is based on a previously obtained gesture set; and
predict the gesture based on the gesture classification.

5. The electronic device of claim 4, wherein the previously obtained gesture set comprises:
a swipe center-left-center (CLC) gesture;
a swipe center-right-center (CRC) gesture;
a swipe center-down-center (CDC) gesture; and
a swipe center-up-center (CUC) gesture.

6. The electronic device of claim 4, wherein to obtain the previously obtained gesture set, the processor is further configured to:
define a set of gestures with common burst attributes;
collect a plurality of samples for each gesture;
compute burst attributes for each sample;
derive statistical summaries for each burst attribute; and
obtain a set of thresholds to separate gestures from non-gestures.

7. The electronic device of claim 6, wherein the processor is further configured to:
collect a plurality of samples for non-gestures;
determine whether a probability of false positive and false negative gesture classifications is below an acceptable threshold; and
if the probability of false positive and false negative gesture classifications is below the acceptable threshold, accept the set of thresholds to separate gestures from non-gestures.

8. The electronic device of claim 6, wherein each gesture from the gesture set is defined in relation to a number of major bursts, minor bursts, and a pattern of bursts in a sequence.

9. The electronic device of claim 1, wherein to determine whether the predicted gesture is a valid gesture, the processor is further configured to:
determine a correlation between the extracted features; and
determine whether the predicted gesture is a valid gesture based on the correlation between the extracted features.

10. The electronic device of claim 1, wherein the plurality of features comprises:
radial velocity;
azimuth velocity; and
elevation velocity.

11. The electronic device of claim 1, wherein the burst attributes comprise at least one of:
burst length;
burst height;
burst area;
burst sign; and
whether a burst is part of a burst chain.

12. A method of operating an electronic device, the method comprising:
identifying, based on received radar signals, a plurality of radar frames related to an activity of a target;
extracting a plurality of features from the plurality of radar frames;
computing burst attributes for the extracted features;
predicting a gesture based on the burst attributes;
determining whether the predicted gesture is a valid gesture; and
if the predicted gesture is a valid gesture, performing an action corresponding to the predicted gesture.

13. The method of claim 12, wherein extracting the plurality of features from the plurality of radar frames comprises, for each radar frame:
obtaining a Range-Doppler map;
selecting a column corresponding to a peak of the target in a range profile;
calculating an average radial velocity of the target;
obtaining an azimuth and elevation angle spectrum corresponding to a target peak;
calculating an average angle of the target; and
obtaining average azimuth/elevation tangential velocities based on a target angle variation over two frames.

14. The method of claim 12, further comprising:
determining, based on the burst attributes, whether the activity of the target is a valid activity,
wherein the gesture is predicted based on the activity of the target being the valid activity.

15. The method of claim 12, wherein to predicting the gesture comprises:
determining whether symmetry and pattern criteria for the burst attributes are met;

based on whether the symmetry and pattern criteria for the burst attributes are met, determining whether the activity is a valid activity;

performing a gesture classification on the activity if the activity is a valid activity, wherein the gesture classification is based on a previously obtained gesture set; and predicting the gesture based on the gesture classification.

16. The electronic device of claim 15, wherein obtaining the previously obtained gesture set comprises:
   defining a set of gestures with common burst attributes;
   collecting a plurality of samples for each gesture;
   computing burst attributes for each sample;
   deriving statistical summaries for each burst attribute;
   obtaining a set of thresholds to separate gestures from non-gestures;
   collecting a plurality of samples for non-gestures;
   determining whether a probability of false positive and false negative gesture classifications is below an acceptable threshold; and
   if the probability of false positive and false negative gesture classifications is below the acceptable threshold, accepting the set of thresholds to separate gestures from non-gestures.

17. The method of claim 15, wherein each gesture from the gesture set is defined in relation to a number of major bursts, minor bursts, and a pattern of bursts in a sequence.

18. The method of claim 12, wherein determining whether the predicted gesture is a valid gesture comprises:
   determining a correlation between the extracted features; and
   determining whether the predicted gesture is a valid gesture based on the correlation between the extracted features.

19. The method of claim 12, wherein the plurality of features comprises:
   radial velocity;
   azimuth velocity; and
   elevation velocity.

20. The method of claim 12, wherein the burst attributes comprise at least one of:
   burst length;
   burst height;
   burst area;
   burst sign; and
   whether a burst is part of a burst chain.

* * * * *